United States Patent
Kim et al.

(10) Patent No.: US 10,216,932 B2
(45) Date of Patent: Feb. 26, 2019

(54) NONVOLATILE MEMORY DEVICES AND SOLID STATE DRIVES INCLUDING THE SAME

(71) Applicant: SAMSUNG ELECTRONICS CO., LTD., Suwon-si, Gyeonggi-do (KR)

(72) Inventors: Jung-Soo Kim, Yongin-si (KR); Bong-Kil Jung, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 178 days.

(21) Appl. No.: 15/296,169

(22) Filed: Oct. 18, 2016

(65) Prior Publication Data

US 2017/0109527 A1  Apr. 20, 2017

(30) Foreign Application Priority Data

Oct. 19, 2015  (KR) .................. 10-2015-0145049

(51) Int. Cl.
| | |
|---|---|
| G06F 21/55 | (2013.01) |
| G11C 16/22 | (2006.01) |
| G11C 16/08 | (2006.01) |
| G06F 21/75 | (2013.01) |
| G11C 16/04 | (2006.01) |
| G11C 17/14 | (2006.01) |

(52) U.S. Cl.
CPC .......... *G06F 21/556* (2013.01); *G06F 21/755* (2017.08); *G11C 16/08* (2013.01); *G11C 16/22* (2013.01); *G11C 16/0483* (2013.01); *G11C 17/14* (2013.01)

(58) Field of Classification Search
CPC .. G06F 21/55; G06F 21/556; H04L 29/06911; G11C 16/22
See application file for complete search history.

(56) References Cited

U.S. PATENT DOCUMENTS

| | | | |
|---|---|---|---|
| 5,299,125 A * | 3/1994 | Baker | G09B 21/00 434/112 |
| 6,026,293 A | 2/2000 | Osborn | |
| 6,094,724 A * | 7/2000 | Benhammou | G06Q 20/105 726/20 |

(Continued)

FOREIGN PATENT DOCUMENTS

| | | |
|---|---|---|
| JP | 2001-256119 | 9/2001 |
| JP | 3592929 | 9/2004 |

(Continued)

*Primary Examiner* — Eleni A Shiferaw
*Assistant Examiner* — Sher A Khan
(74) *Attorney, Agent, or Firm* — F. Chau & Associates, LLC

(57) ABSTRACT

A nonvolatile memory device includes a memory cell array, a voltage generator, and a control circuit. The voltage generator generates word-line voltages to be applied to the memory cell array. The control circuit generates control signals that control the voltage generator in response to a command and an address. The control circuit includes a hacking detection circuit. The hacking detection circuit disables an operation of the nonvolatile memory device when a hacking is detected, wherein the hacking is detected when an access sequence of the command and the address does not match a standard sequence of the nonvolatile memory device a consecutive number of times.

19 Claims, 18 Drawing Sheets

(56) References Cited

U.S. PATENT DOCUMENTS

| | | | |
|---|---|---|---|
| 6,415,370 B1 | 7/2002 | Nakajima | |
| 7,679,133 B2 | 3/2010 | Son et al. | |
| 8,446,772 B2 | 5/2013 | Tu et al. | |
| 8,528,081 B2* | 9/2013 | Na | G06F 21/54 |
| | | | 707/687 |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,975,748 B1 | 3/2015 | Thacker, III | |
| 2002/0174309 A1* | 11/2002 | Naccache | G06F 12/1425 |
| | | | 711/163 |
| 2003/0149914 A1* | 8/2003 | Kim | G06F 21/87 |
| | | | 714/30 |
| 2005/0017752 A1 | 1/2005 | Kim | |
| 2008/0043544 A1* | 2/2008 | Liaw | G11C 7/065 |
| | | | 365/191 |
| 2008/0209550 A1* | 8/2008 | Di Iorio | G06F 21/558 |
| | | | 726/22 |
| 2008/0215841 A1 | 9/2008 | Bolotin et al. | |
| 2009/0106563 A1* | 4/2009 | Cherpantier | G06F 21/86 |
| | | | 713/194 |
| 2009/0119447 A1* | 5/2009 | Lee | G11C 11/5635 |
| | | | 711/103 |
| 2009/0180307 A1* | 7/2009 | Kurjanowicz | G11C 17/10 |
| | | | 365/96 |
| 2011/0216603 A1* | 9/2011 | Han | G11C 16/04 |
| | | | 365/185.23 |
| 2011/0233648 A1 | 9/2011 | Seol et al. | |
| 2012/0230087 A1* | 9/2012 | Chellappa | G11C 5/005 |
| | | | 365/154 |
| 2014/0230079 A1* | 8/2014 | Alam | G06F 21/78 |
| | | | 726/34 |
| 2014/0241085 A1* | 8/2014 | Ryu | G11C 29/04 |
| | | | 365/200 |
| 2016/0012897 A1* | 1/2016 | Kwak | G11C 16/10 |
| | | | 365/185.17 |
| 2016/0021121 A1* | 1/2016 | Cui | H04L 63/145 |
| | | | 726/1 |

FOREIGN PATENT DOCUMENTS

| | | |
|---|---|---|
| JP | 2006-172384 | 6/2006 |
| KR | 10-2000-0022610 | 4/2000 |
| KR | 10-2005-0011317 | 1/2005 |
| KR | 10-0492840 | 5/2005 |
| KR | 10-0590671 | 6/2006 |
| KR | 10-2010-0029298 | 3/2010 |
| KR | 10-1334968 | 11/2013 |

* cited by examiner

| CLE | COMMAND LATCH ENABLE |
|---|---|
| ALE | ADDRESS LATCH ENABLE |
| nCE | CHIP ENABLE |
| nRE | READ ENABLE |
| nWE | WRITE ENABLE |

BLKa

NONVOLATILE MEMORY DEVICES AND SOLID STATE DRIVES INCLUDING THE SAME

CROSS-REFERENCE TO RELATED APPLICATION

This U.S. non-provisional patent application claims priority under 35 U.S.C. § 119 to Korean Patent Application No. 10-2015-0145049, filed on Oct. 19, 2015, in the Korean Intellectual Property Office (KIPO), the disclosure of which is incorporated by reference herein in its entirety.

TECHNICAL FIELD

Exemplary embodiments of the present inventive concept relate generally to semiconductor memory devices, and more particularly, to nonvolatile memory devices and solid state drives including the same.

DISCUSSION OF THE RELATED ART

Semiconductor memory devices may be classified as volatile semiconductor memory devices or nonvolatile semiconductor memory devices. Volatile semiconductor memory devices may perform read and write operations at high speed, while contents stored therein may be lost in the absence of power. Nonvolatile semiconductor memory devices may retain contents stored therein in the absence of power. For this reason, nonvolatile semiconductor memory devices may be used to store contents in devices that tend to be powered off.

Nonvolatile semiconductor memory devices may include a mask read-only memory (MROM), a programmable ROM (PROM), an erasable programmable ROM (EPROM), an electrically erasable programmable ROM (EEPROM), etc.

A flash memory device is an example of a nonvolatile memory device. A flash memory device may be used as the voice and image storing media of electronic apparatuses such as a computer, a cellular phone, a personal digital assistant (PDA), a digital camera, a camcorder, a voice recorder, an MP3 player, a handheld personal computer (PC), a game machine, a facsimile, a scanner, a printer, etc.

Recently, attempts to hack into flash memory devices have increased.

SUMMARY

According to an exemplary embodiment of the present inventive concept, a nonvolatile memory device includes a memory cell array, a voltage generator, and a control circuit. The voltage generator generates word-line voltages to be applied to the memory cell array. The control circuit generates control signals that control the voltage generator in response to a command and an address. The control circuit includes a hacking detection circuit. The hacking detection circuit disables an operation of the nonvolatile memory device when a hacking is detected, wherein the hacking is detected when an access sequence of the command and the address does not match a standard sequence of the nonvolatile memory device a consecutive number of times.

In an exemplary embodiment of the present inventive concept, the hacking detection circuit may include an access sequence analyzer, a counter and a hacking detection signal generator. The access sequence analyzer may analyze the access sequence and output a decision signal that is enabled when the access sequence does not match the standard sequence. The counter may count the decision signal that is enabled and output a counting signal. The hacking detection signal generator may receive the counting signal and output a hacking detection signal that is enabled when the counting signal exceeds a reference value.

The access sequence analyzer may output the decision signal without regard to an input sequence of the access sequence.

The access sequence analyzer may output the decision signal depending on an input sequence of the access sequence.

In an exemplary embodiment of the present inventive concept, the control circuit may further include a command decoder, a control signal generator, a first switch, and a second switch. The command decoder may decode the command and output a decoded command. The control signal generator may generate the control signals in response to the decoded command. The first switch may be connected between the command decoder and a first path that is connected to the control signal generator. The second switch may be connected to the command decoder, a second path and the first switch and the second path may be connected to the control signal generator separately from the first path.

The first switch may connect a first terminal of the second switch to the control signal generator except when the hacking is detected. The second switch may connect the command decoder to the first switch except when a recovery code is applied to the second switch.

When the hacking is detected, the hacking detection circuit may output a hacking detection signal to the control signal generator and the control signal generator may provide a hacking control signal to the voltage generator in response to the hacking detection signal and in response to the hacking control signal a high voltage is applied to the first switch from the voltage generator and the first path is blocked.

When the hacking is detected, the control circuit may program data code associated with the hacking in a setup data region of the memory cell array. The control circuit may further include a data detector that reads the data code from the setup data region when a power is applied to the nonvolatile memory device. The data detector may provide a code detection signal to the control signal generator in response to the read data code, the control signal generator may provide a hacking control signal to the voltage generator in response to the code detection signal and the voltage generator may provide a high voltage to the first switch in response to the hacking control signal to block the first path.

The first switch may include a p-channel metal oxide semiconductor (PMOS) transistor and the PMOS transistor may have a first electrode coupled to a first terminal of the second switch, a gate coupled to a ground voltage and a second electrode coupled to the first path.

The first switch may include a fuse connected between a first terminal of the second switch and the first path.

When the hacking is determined as valid after the first path is blocked by a high voltage, the second switch may connect the command decoder to the second path in response to a recovery code provided from the command decoder.

In an exemplary embodiment of the present inventive concept, the memory cell array may include a two-dimensional memory cell array formed on a substrate in a two-dimensional structure.

In an exemplary embodiment of the present inventive concept, the memory cell array may include a three-dimensional memory cell array formed on a substrate in a three-dimensional structure.

According to an exemplary embodiment of the present inventive concept, a solid-state drive includes a plurality of nonvolatile memory devices and a controller. The controller controls the nonvolatile memory devices. The controller includes a hacking detection circuit. The hacking detection circuit disables an operation of a first of the nonvolatile memory devices when a first hacking is detected, wherein the first hacking is detected when an access sequence of a command and an address for accessing a memory cell array of the first nonvolatile memory device does not match with a standard sequence of the first nonvolatile memory device a predetermined number of times consecutively.

In an exemplary embodiment of the present inventive concept, the controller may include a nonvolatile memory interface configured to perform an interfacing with the nonvolatile memory devices and the nonvolatile memory interface may include the hacking detection circuit.

In an exemplary embodiment of the present inventive concept, the hacking detection circuit is configured to disable an operation of a second of the nonvolatile memory devices when a second hacking is detected, wherein the second hacking is detected when an access sequence of a command and an address for accessing a memory cell array of the second nonvolatile memory device does not match a standard sequence of the second nonvolatile memory device a predetermined number of times consecutively.

According to an exemplary embodiment of the present inventive concept, a nonvolatile memory device includes: a hacking detection circuit configured to detect a hacking of the nonvolatile memory device based on a received command and address; a control signal generator configured generate a hacking control signal when the hacking is detected; a voltage generator configured to receive the hacking control signal and output a first voltage signal; a first switch connected between a command decoder and the control signal generator, wherein the connection from the first switch to the control signal generator is cut response to the first voltage signal; and a second switch connected between the command decoder and the control signal generator, wherein the second switch is activated in response to a signal indicating that the hacking has ended.

The first switch may be disposed between the second switch and the control signal generator along a first path.

When the second switch is activated in response to the signal indicating that the hacking has ended, a second path may be formed between the second switch and the control signal generator.

The first switch may be a fuse.

BRIEF DESCRIPTION OF THE DRAWINGS

The above and other features of the present inventive concept will become more clearly understood by describing in detail exemplary embodiments thereof with reference to the accompanying drawings.

DETAILED DESCRIPTION OF THE EMBODIMENTS

Figures 1, 2:
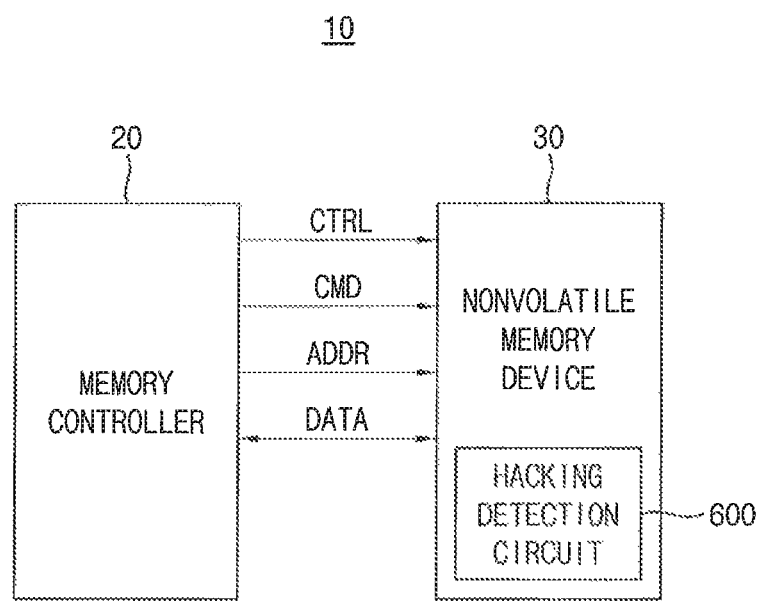
FIG. 1 is a block diagram illustrating a memory system according to an exemplary embodiment of the present inventive concept.
FIG. 2 is a table illustrating control signals in the memory system of FIG. 1 according to an exemplary embodiment of the present inventive concept.

Exemplary embodiments of the present inventive concept will be described more fully hereinafter with reference to the accompanying drawings. The present inventive concept may, however, be embodied in many different forms and should not be construed as limited to the exemplary embodiments set forth herein. In the drawings, the sizes and relative sizes of layers and regions may be exaggerated for clarity. Like numerals may refer to like elements throughout this application. All elements shown in the drawings or hereinafter described may be composed of circuits.

It will be understood that when an element is referred to as being "connected" or "coupled" to another element, it can be directly connected or coupled to the other element or intervening elements may be present.

As used herein, the singular forms "a," "an" and "the" are intended to include the plural forms as well, unless the context clearly indicates otherwise.

FIG. 1 is a block diagram illustrating a memory system according to an exemplary embodiment of the present inventive concept.

Referring to FIG. 1, a memory system (e.g., a nonvolatile memory system) 10 may include a memory controller 20 and at least one nonvolatile memory device 30.

The memory system 10 may include flash memory based data storage media such as a memory card, a universal serial bus (USB) memory and a solid state drive (SSD).

The nonvolatile memory device 30 may perform an erase operation, a program operation or a write operation under control of the memory controller 20. The nonvolatile memory device 30 receives a command CMD, an address ADDR and data DATA through input/output lines from the memory controller 20 for performing operations such as erase, program and write. In addition, the nonvolatile memory device 30 receives a control signal CTRL through a control line from the memory controller 20.

The nonvolatile memory device 30 may include a hacking detection circuit 600. The hacking detection circuit 600 may disable operation of the nonvolatile memory device 30 when the hacking detection circuit 600 detects invalid access sequences made to the nonvolatile memory device 30.

FIG. 2 is a table illustrating control signals in the memory system of FIG. 1 according to an exemplary embodiment of the present inventive concept.

Referring to FIGS. 1 and 2, the control signal CTL, which the memory controller 20 applies to the nonvolatile memory device 30, may include a command latch enable signal CLE, an address latch enable signal ALE, a chip enable signal nCE, a read enable signal nRE, and a write enable signal nWe.

The memory controller 20 may transmit the command latch enable signal CLE to the nonvolatile memory device 30. The memory controller 20 may transmit the command latch enable signal CLE to the nonvolatile memory device 30 via a separately assigned control pin. The command latch enable signal CLE may be a signal indicating that information transferred via the input/output lines is a command.

The memory controller 20 may transmit the address latch enable signal ALE to the nonvolatile memory device 30. The memory controller 20 may transmit the address latch enable signal ALE to the nonvolatile memory device 30 via a separately assigned control pin. The address latch enable signal ALE may be a signal indicating that information transferred via the input/output lines is an address.

The memory controller 20 may transmit the chip enable signal nCE to the nonvolatile memory device 30. The memory controller 20 may transmit the chip enable signal nCE to the nonvolatile memory device 30 via a separately assigned control pin. The chip enable signal nCE may identify a memory chip selected from among a plurality of memory chips when the nonvolatile memory device 30 includes the plurality of memory chips.

The memory controller 20 may transmit the read enable signal nRE to the nonvolatile memory device 30. The memory controller 20 may transmit the read enable signal nRE to the nonvolatile memory device 30 via a separately assigned control pin. The nonvolatile memory device 30 may transmit read data to the memory controller 20 based on the read enable signal nRE.

The memory controller 20 may transmit the write enable signal nWE to the nonvolatile memory device 30. The memory controller 20 may transmit the write enable signal nWE to the nonvolatile memory device 30 via a separately assigned control pin. When the write enable signal nWE is activated, the nonvolatile memory device 30 may store data input signals provided from the memory controller 20 as a command CMD or an address ADDR.

Figure 3:
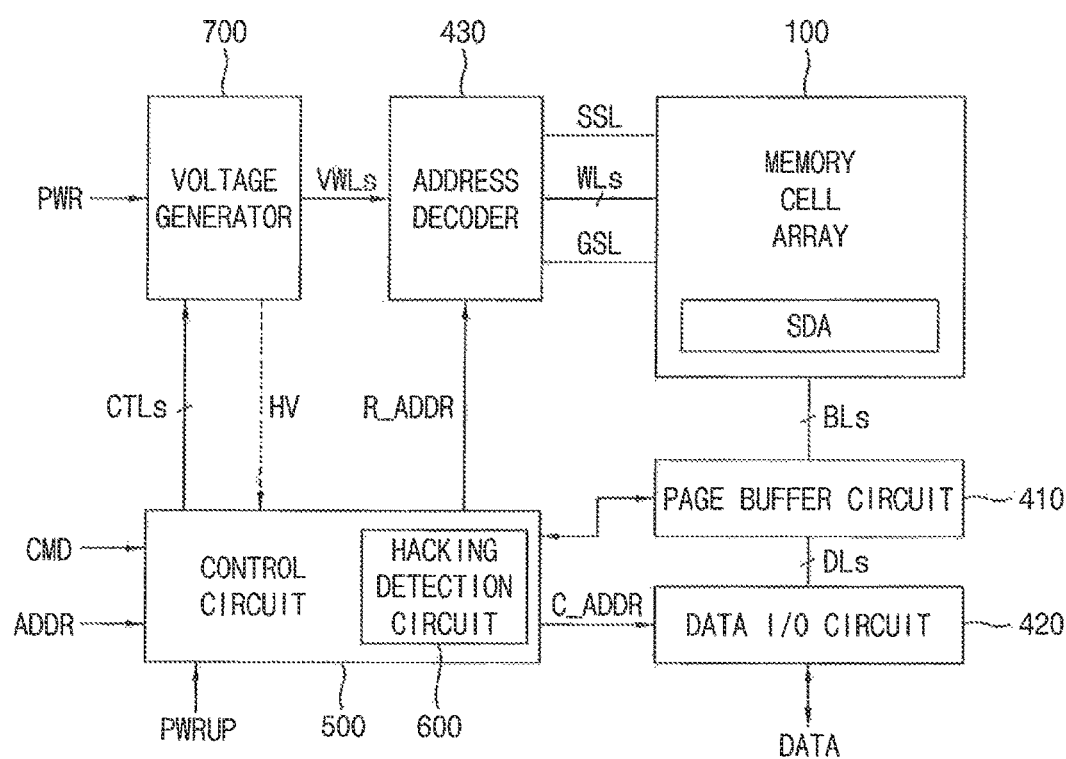
FIG. 3 is a block diagram illustrating a nonvolatile memory device in the memory system of FIG. 1 according to an exemplary embodiment of the present inventive concept.

FIG. 3 is a block diagram illustrating the nonvolatile memory device in the memory system of FIG. 1 according to an exemplary embodiment of the present inventive concept.

Referring to FIG. 3, the nonvolatile memory device 30 includes a memory cell array 100, an address decoder 430, a page buffer circuit 410, a data input/output circuit 420, a control circuit 500, and a voltage generator 700. The control circuit 500 may include the hacking detection circuit 600.

The memory cell array 100 may be coupled to the address decoder 430 through a string selection line SSL, a plurality of word-lines WLs, and a ground selection line GSL. In addition, the memory cell array 100 may be coupled to the page buffer circuit 410 through a plurality of bit-lines BLs.

The memory cell array 100 may include a plurality of memory cells coupled to the plurality of word-lines WLs and the plurality of bit-lines BLs.

In an exemplary embodiment of the present inventive concept, the memory cell array 100 may be a three-dimensional memory cell array, which is formed on a substrate in a three-dimensional structure (e.g., a vertical structure). In this case, the memory cell array 100 may include vertical cell strings that are vertically oriented such that at least one memory cell is located over another memory cell. The following patent documents, which are hereby incorporated by reference in their entireties, describe configurations of three-dimensional memory cell arrays: U.S. Pat. Nos. 7,679, 133; 8,553,466; 8,654,587; 8,559,235; and U.S. Pat. Pub. No. 2011/0233648.

In an exemplary embodiment of the present inventive concept, the memory cell array 100 may be a two-dimensional memory cell array, which is formed on a substrate in a two-dimensional structure (e.g., a horizontal structure).

The memory cell array 100 may include a setup data region SDA and a user data region. Setup data of the nonvolatile memory device 30 may be stored in the setup data region SDA and user data may be stored in the user data region.

The setup data may be data for setting up an operation environment of the nonvolatile memory device 30. For example, various voltage levels used for the operation of the nonvolatile memory device 30 may be set up based on the setup data. For example, a column defect and a block defect of the nonvolatile memory device 30 may be managed based on the setup data. The column defect and the block defect are detected in a test step after fabrication of the nonvolatile memory device 30, and the setup data may be determined according to a result of the detection.

For example, an algorithm used for the operation of the nonvolatile memory device 30 may be determined according to the setup data (e.g., algorithm tuning). For example, the setup data may include identification (ID) information of the nonvolatile memory device 30. For example, the setup data may be data associated with a hacking detection indicating that the nonvolatile memory device 30 is being attacked by an invalid user.

When a power starts to be supplied to the nonvolatile memory device 30 (e.g., when a power-up signal PWRUP is applied to the nonvolatile memory device 30), the nonvolatile memory device 30 may sense the setup data and operate based on the sensed data.

Figure 4:
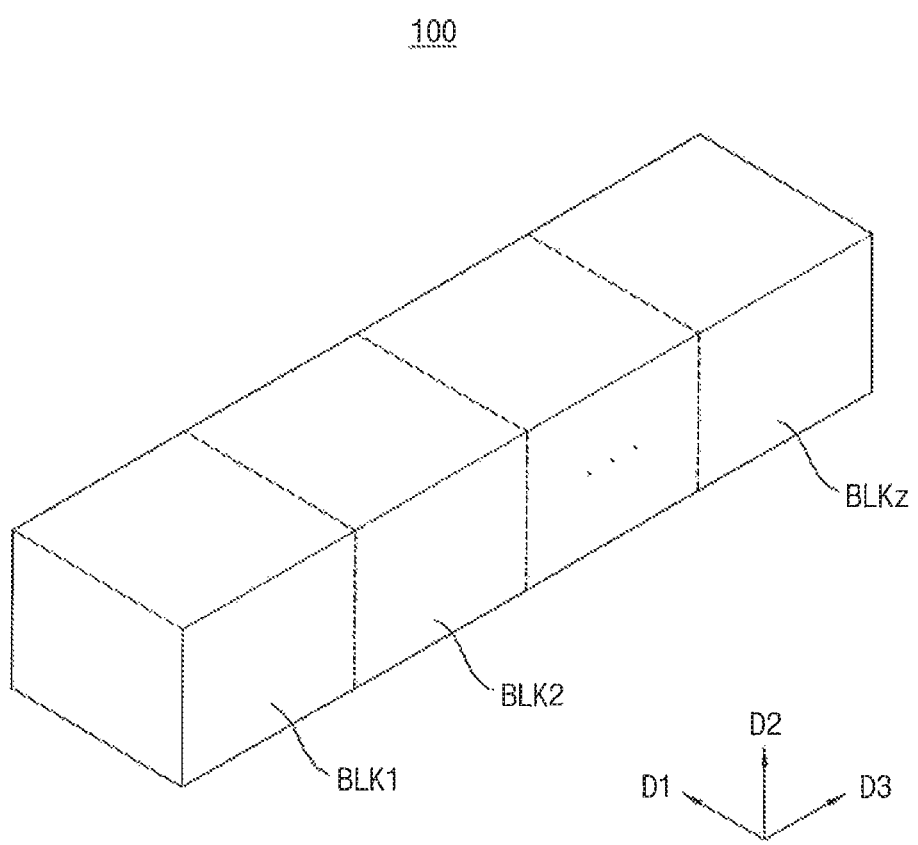
FIG. 4 is a block diagram illustrating a memory cell array in FIG. 3 according to an exemplary embodiment of the present inventive concept.

FIG. 4 is a block diagram illustrating the memory cell array in FIG. 3 according to an exemplary embodiment of the present inventive concept.

Referring to FIG. 4, the memory cell array 100 may include a plurality of memory blocks BLK1 to BLKz. In an exemplary embodiment of the present inventive concept, the memory blocks BLK1 to BLKz are selected by the address decoder 430 in FIG. 3. For example, the address decoder 430 may select a memory block BLK corresponding to a block address among the memory blocks BLK1 to BLKz.

Figure 5:
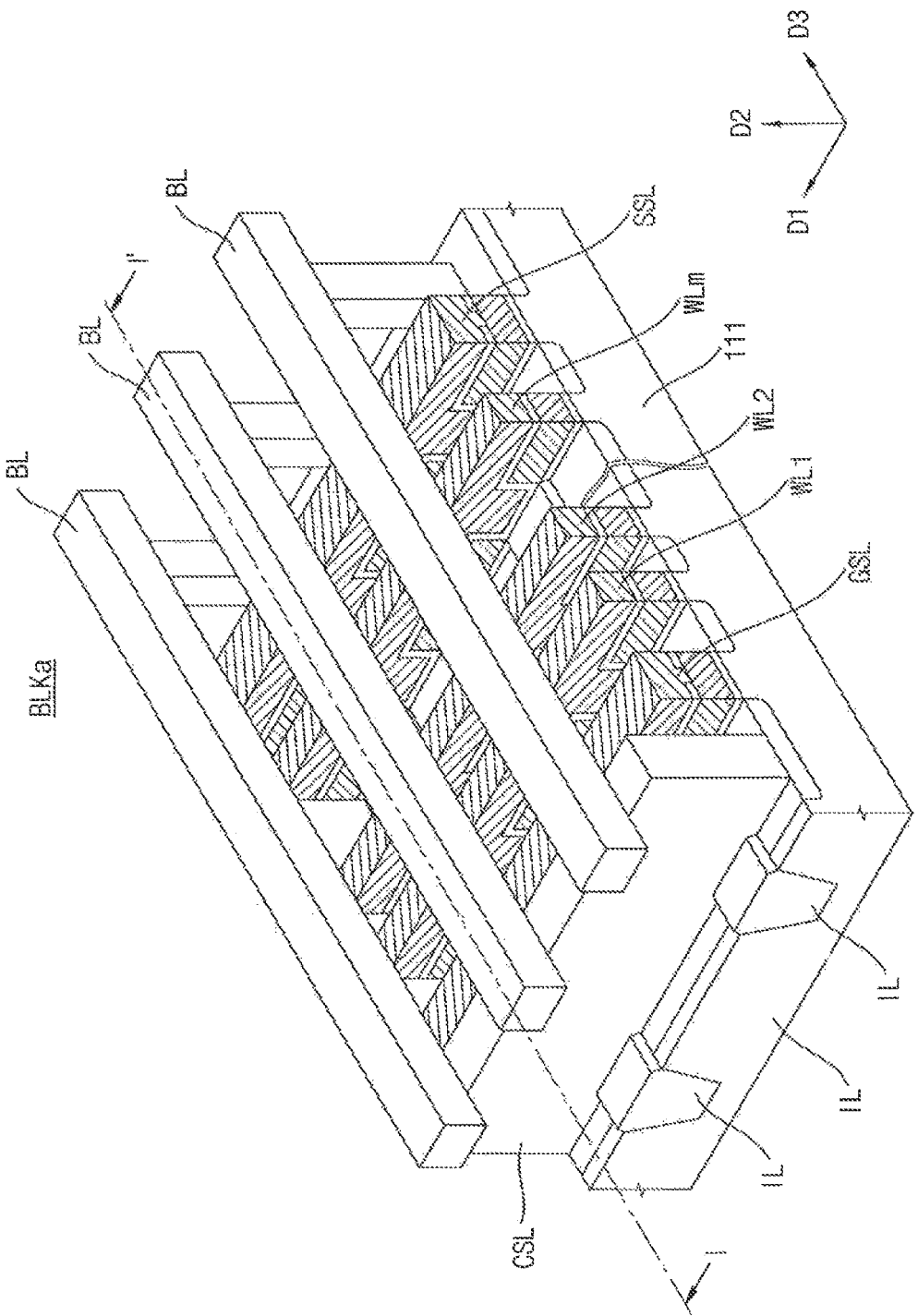
FIG. 5 is a perspective view illustrating a memory block of FIG. 4 according to an exemplary embodiment of the present inventive concept.
Figure 6:
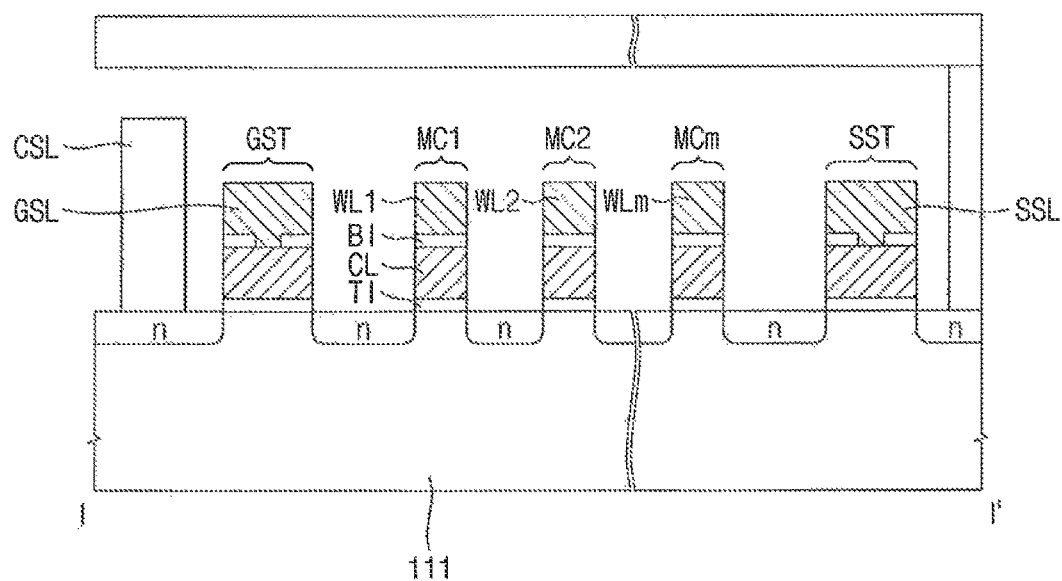
FIG. 6 is a sectional view taken along a line I-I' of the memory block of FIG. 5 according to an exemplary embodiment of the present inventive concept.

FIG. 5 is a perspective view illustrating one of the memory blocks of FIG. 4 according to an exemplary embodiment of the present inventive concept. FIG. 6 is a sectional view taken along a line I-I' of the memory block of FIG. 5 according to an exemplary embodiment of the present inventive concept.

Referring to FIGS. 5 and 6, a substrate 111 of the memory block BLKa is provided. For example, the substrate 111 is a well having a p-conductive type.

A device isolation layer IL is provided on the substrate 111 to define an active region. For example, FIG. 5 shows three active regions that extend along a third direction D3 and are spaced along a first direction D1 by a specific distance. However, the number of active regions is not limited thereto.

A tunnel insulation layer TI is provided on each active region. In each active region, the tunnel insulation layers TI are spaced along the third direction D3 by a specific distance. For example, each tunnel insulation layer TI may include a thermal oxide layer. For example, each tunnel insulation layer TI may include an oxide layer.

In each active region, charge storage layers CL are provided on the tunnel insulation layers TI. For example, the charge storage layers CL may include a conductive material such as polysilicon. For example, each charge storage layer CL may include a nitride layer or a metal oxide layer (e.g., an aluminum oxide layer, or a hafnium oxide layer).

If the charge storage layers CL include a conductive material such as polysilicon, the charge storage layers CL may operate as floating gates. In other words, the charge storage layers CL store data by accumulating charges. If the charge storage layers CL include an insulation material, the charge storage layers CL operate as charge trapping layers. In other words, the charge storage layers CL store data by trapping charges.

The tunnel insulation layers TI and charge storage layers CL are provided along the first direction D1 on a plurality of active regions. On an axial line where the tunnel insulation layers TI and the charge storage layers CL are provided along the first direction D1, block insulation layers BI are provided along the first direction D1. Each block insulation layer BI may include a nitride layer. Each blocking insulation layer BI may include a high dielectric layer (e.g., an aluminum oxide layer, or a hafnium oxide layer) having a higher dielectric constant than that of the tunneling insulation layers TI.

A polysilicon layer is provided on the tunnel insulation layers TI. The polysilicon layer extends along the first direction D1 on a plurality of active regions. The polysilicon layer is spaced along the third direction D3 by a specific distance.

Each of the tunneling insulation layer TI, the charge storage layer CL, the blocking insulation layer BI, and the polysilicon layer constitutes a gate structure. In an exemplary embodiment of the present inventive concept, each of the tunneling insulation layer TI, the charge storage layer CL, the blocking insulation layer BI, and the polysilicon layer may constitute a memory cell MC. In an exemplary embodiment of the present inventive concept, in a specific gate structure, perforation is formed in the blocking insulation layer BI such that the polysilicon layer and the charge storage layer CL may be connected. This gate structure may form a selection transistor, e.g., a string selection transistor (SST) or a ground selection transistor (GST).

If the charge storage layer CL includes an insulation material, perforations may not be provided at a blocking insulation layer BI of a gate structure. In other words, a charge storage layer CL and a control polysilicon layer of a gate structure of a selection transistor SST or GST may not be separated by a blocking insulation layer BI.

In an exemplary embodiment of the present inventive concept, a polysilicon layer forming a gate structure of a memory cell may extend along the first direction D1 to form a word-line WL. In an exemplary embodiment of the present inventive concept, the polysilicon layer forming a gate structure of the selection transistor SST or GST may extend along the first direction D1 to form a selection line, e.g., a string selection line (SSL) or a ground selection line (GSL).

Junction regions having an n conductive type are formed between gate structures. At this point, a source and a drain of a selection transistor SST or GST can be formed simultaneously. A conductive material extending along the first direction D1 is provided on a source of a ground selection transistor GST. This conductive material forms a common source line CSL. The common source line CSL may include, for example, polysilicon. The common source line CSL may include, for example, metal.

A bit-line contact BP connected to a bit-line BL is provided on a drain of the string selection transistor SST. In other words, a drain of the string selection transistor SST is connected to a corresponding bit-line BL through the bit-line contact BP. Bit lines BL are provided on the same axial line as the active regions. For example, three bit-lines BL are shown.

Figure 7:
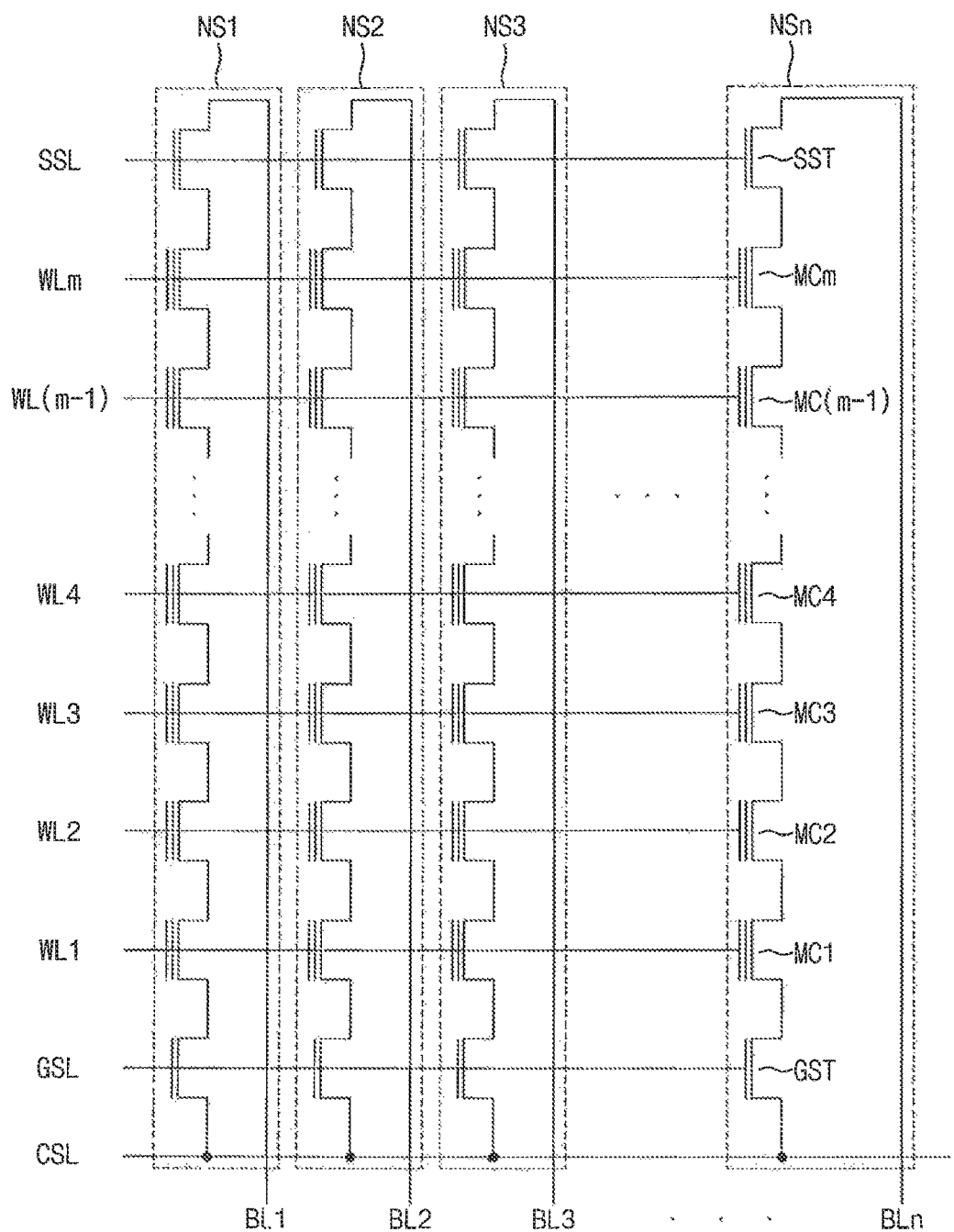
FIG. 7 is a circuit diagram illustrating an equivalent circuit of the memory block described with reference to FIGS. 5 and 6 according to an exemplary embodiment of the present inventive concept.

FIG. 7 is a circuit diagram illustrating an equivalent circuit of the memory block described with reference to FIGS. 5 and 6 according to an exemplary embodiment of the present inventive concept.

The memory block BLKa of FIG. 7 may be formed on a substrate in a two-dimensional structure (e.g., a horizontal structure). For example, a plurality of memory cell strings included in the memory block BLKa may be formed in a direction parallel to the substrate.

Referring to FIG. 7, the memory block BLKa may include memory cell strings NS1 to NSn.

Each of the memory cell strings NS1 to NSn may include a string selection transistor SST, a plurality of memory cells MC (e.g., MC1 to MCm), and a ground selection transistor GST that are serially connected to each other.

The string selection transistor SST included in each of the memory cell strings NS1 to NSm may be commonly connected to the string selection line SSL. Memory cells arranged in a same row among memory cells MC1 to MCm included in each of the memory cell strings NS1 to NSn may be commonly connected to corresponding word-lines WL1 to WLm. The ground selection transistor GST included in each of the memory cell strings NS1 to NSn may be commonly connected to the ground selection line GSL.

The ground selection transistors GST included in each of the memory cell strings NS1 to NSx may be commonly connected to the common source line CSL. The string selection transistor SST included in each of the memory cell strings NS1 to NSn may be connected to corresponding bit-lines BL1 to BLn. Here, n and m represent positive integers.

Figure 8:
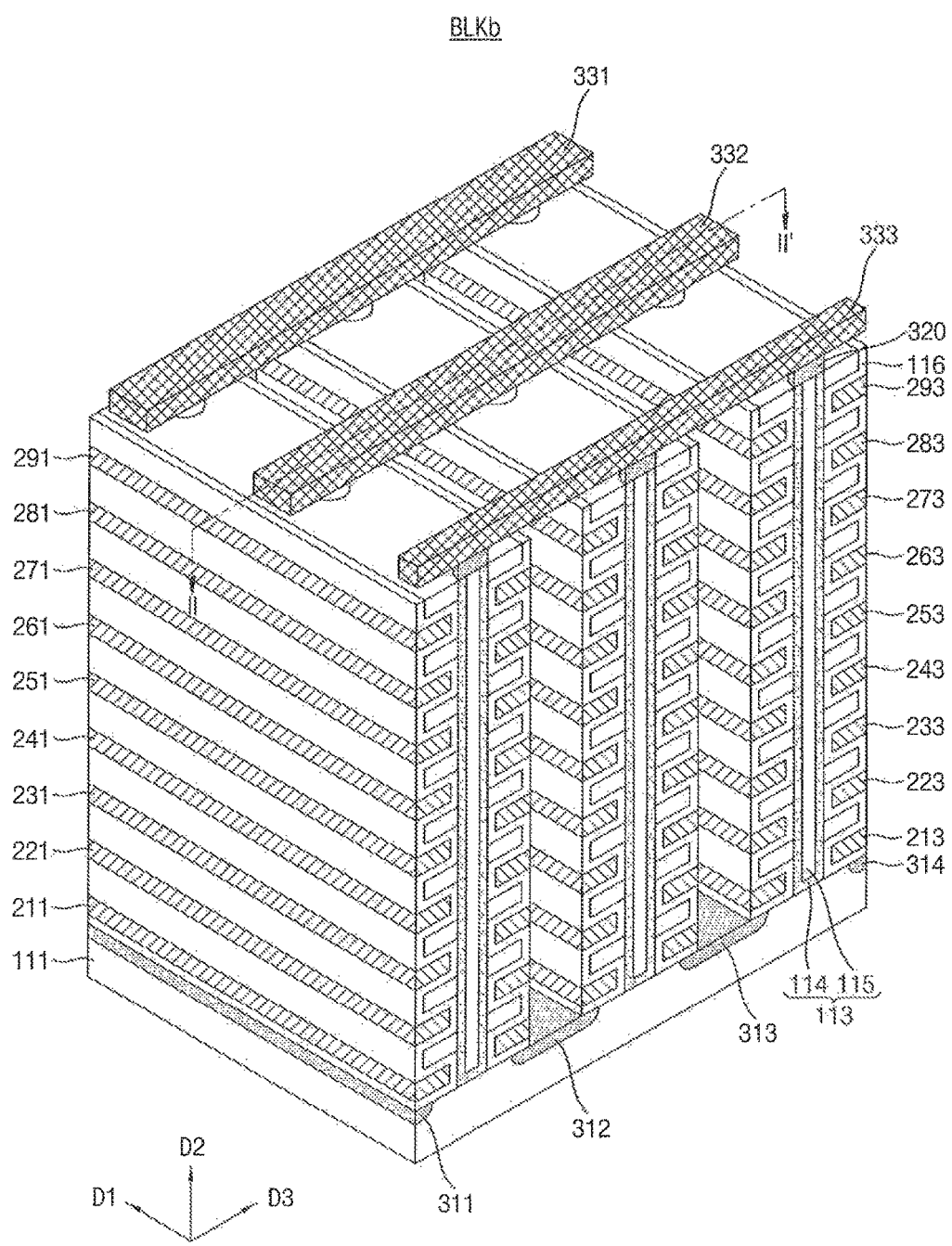
FIG. 8 is a perspective view illustrating a memory block of FIG. 4 according to an exemplary embodiment of the present inventive concept.
Figure 9:
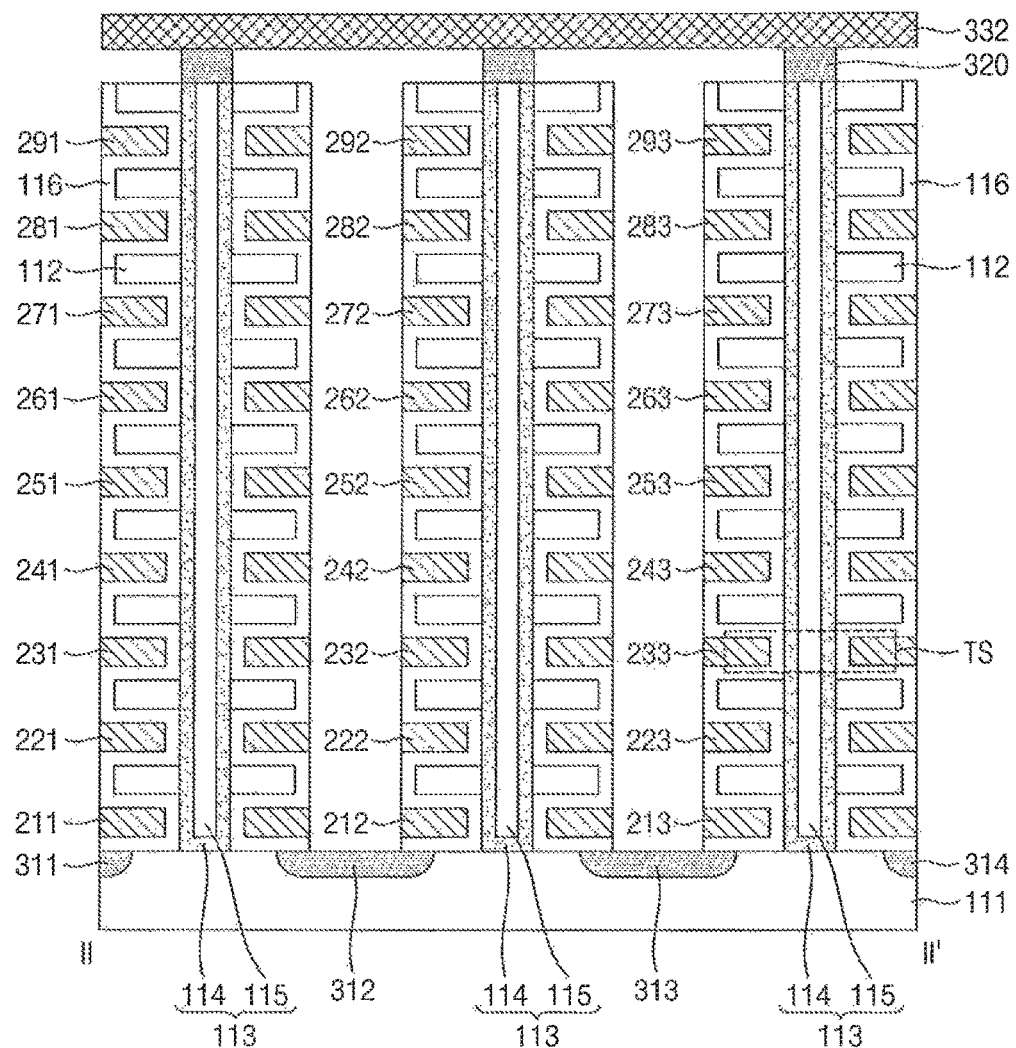
FIG. 9 is a sectional view taken along a line II-II' of the memory block of FIG. 8 according to an exemplary embodiment of the present inventive concept.

FIG. 8 is a perspective view illustrating one of the memory blocks of FIG. 4 according to an exemplary embodiment of the present inventive concept. FIG. 9 is a sectional view taken along a line II-II' of the memory block of FIG. 8 according to an exemplary embodiment of the present inventive concept.

Referring to FIGS. 8 and 9, the memory block BLKb includes structures extending along the first to third directions D1~D3.

A substrate 111 is provided. For example, the substrate 111 may have a well of a first type (e.g., a first conductive type). For example, the substrate 111 may have a p-well formed by implanting a group 3 element such as boron (B). For example, the substrate 111 may have a pocket p-well provided in an n-well. In an exemplary embodiment of the present inventive concept, the substrate 111 has a p-type well (e.g., a p-type packet well). However, the conductive type of the substrate 111 is not limited to the p-type.

A plurality of doping regions 311 to 314 extending along the first direction D1 are provided on the substrate 111. For example, the plurality of doping regions 311 to 314 may have a second type (e.g., a second conductive type) different from the first type of the substrate 111. In an exemplary embodiment of the present inventive concept, the first to fourth doping regions 311 to 314 have an n-type. However, the conductive type of the first to fourth doping regions 311 to 314 is not limited to the n-type.

A plurality of insulation materials 112 extending along the first direction D1 are sequentially provided along the second direction D2 on a region of the substrate 111 between the first and second doping regions 311 and 312. For example, the plurality of insulation materials 112 are provided along the second direction D2, being spaced by a specific distance. For example, the insulation materials 112 may include an insulation material such as an oxide layer.

A plurality of pillars 113 penetrating the insulation materials 112 along the second direction D2 are sequentially disposed along the first direction D1 on a region of the substrate 111 between the first and second doping regions 311 and 312. For example, the plurality of pillars 113 penetrate the insulation materials 112 to contact the substrate 111.

For example, each pillar 113 may include a plurality of materials. For example, a channel layer 114 of each pillar 113 may include a silicon material having a first type. For example, the channel layer 114 of each pillar 113 may include a silicon material having the same type as the substrate 111. In an exemplary embodiment of the present inventive concept, the channel layer 114 of each pillar 113 includes a p-type silicon. However, the channel layer 114 of each pillar 113 is not limited to the p-type silicon.

An internal material 115 of each pillar 113 includes an insulation material. For example, the internal material 115 of each pillar 113 may include an insulation material such as a silicon oxide. For example, the inner material 115 of each pillar 113 may include an air gap.

An insulation layer 116 is provided along the exposed surfaces of the insulation materials 112, the pillars 113, and the substrate 111, on a region between the first and second doping regions 311 and 312. Exemplarily, the insulation layer 116 provided on the exposed surface in the second direction D2 of the last insulation material 112 may be removed.

For example, the thickness of the insulation layer 116 may be less than the half of the distance between the insulation materials 112. In other words, the insulation layer 116 may be half as thick as the region between a pair of the insulation materials 112. First conductive materials 211 to 291 are provided on the exposed surface of the insulation layer 116, in a region between the first and second doping regions 311 and 312. For example, the first conductive material 211 extending along the first direction D1 is provided between the insulation material 112 adjacent to the substrate 111 and the substrate 111. In more detail, the first conductive material 211 extending along the first direction D1 is provided between the insulation layer 116 at the bottom of the insulation material 112 adjacent to the substrate 111 and the substrate 111.

A first conductive material 221 extending along the first direction D1 is provided between the insulation layer 116 above the insulation material 112 adjacent to the substrate 111. In this way, a plurality of first conductive materials 231 to 291 extending along the first direction D1 are provided between the stacked insulation materials 112 and the insulation layer 116 between the stacked insulation materials 112. The first conductive materials 211 to 291 may include a metal material. The first conductive materials 211 to 291 may include a conductive material such as a polysilicon.

The same or similar structures as those on the first and second doping regions 311 and 312 may be provided in a region between the second and third doping regions 312 and 313. For example, in the region between the second and third doping regions 312 and 313, provided are a plurality of insulation materials 112 extending along the first direction D1, and a plurality of pillars 113 disposed sequentially along the first direction D1 and penetrating the plurality of insulation materials 112 along the third direction D3. Further included in the region between the second and third doping regions 312 and 313 is an insulation layer 116 provided on exposed surfaces of the plurality of insulation materials 112 and the plurality of pillars 113, and a plurality of conductive materials 212 to 292 extending along the first direction D1.

In a region between the third and fourth doping regions 313 and 314, the same or similar structures as those on the first and second doping regions 311 and 312 may be provided. For example, in the region between the third and fourth doping regions 313 and 314, provided are a plurality of insulation materials 112 extending along the first direction D1, and a plurality of pillars 113 disposed sequentially along the first direction D1 and penetrating the plurality of insulation materials 112 along the third direction D3. Further included in the region between the third and fourth doping regions 313 and 314 is an insulation layer 116 provided on exposed surfaces of the plurality of insulation materials 112 and the plurality of pillars 113, and a plurality of first conductive materials 213 to 293 extending along the first direction D1.

Drains 320 are provided on the plurality of pillars 113, respectively. The drains 320 may include silicon materials doped with a second type. For example, the drains 320 may include silicon materials doped with an n-type. In an exemplary embodiment of the present inventive concept, the drains 320 include n-type silicon materials. However, the drains 320 are not limited to the n-type silicon materials.

The width of each drain 320 may be greater than that of the pillar 113. For example, each drain 320 may be provided in a pad form on the top of the corresponding pillar 113. Each drain 320 may extend to a portion of the channel layer 114 of the corresponding pillar 113.

On the drains 320, the second conductive materials 331 to 333 extending along the third direction D3 are provided. The second conductive materials 331 to 333 are disposed along the first direction D1, being spaced by a specific distance. The second conductive materials 331 to 333 are respectively connected to the drains 320 in a corresponding region. The drains 320 and the second conductive materials 331 to 333 extending along the third direction D3 may be connected to each other through a contact plug. The second conductive materials 331 to 333 may include metal materials. The second conductive materials 331 to 333 may include conductive materials such as a polysilicon.

Hereinafter, the heights of the first conductive materials 211 to 291, 212 to 292, and 213 to 293 are described. For example, the first conductive materials 211 to 291, 212 to 292, and 213 to 293 sequentially have the first to ninth heights from the substrate 111. In other words, the first conductive materials 211 to 213 adjacent to the substrate 111 have a first height, the first conductive materials 291 to 293 adjacent to the second conductive materials 331 to 333 have a ninth height, and so on. As the first conductive materials 211 to 291, 212 to 292, and 213 to 293 are spaced farther from the substrate 111, the height of the first conductive materials 211 to 291, 212 to 292, and 213 to 293 is increased. For example, first conductive material 251 is higher than first conductive material 241.

Referring to FIGS. 8 and 9, the pillars 113, the insulation layer 116, and the plurality of first conductive materials 211 to 291, 212 to 292, and 213 to 293 form a string. For example, referring to one pillar 113, its insulation layers 116, first conductive materials and insulating materials 112 form a NAND string NS. The NAND string NS includes a plurality of transistor structures TS.

Figure 10:
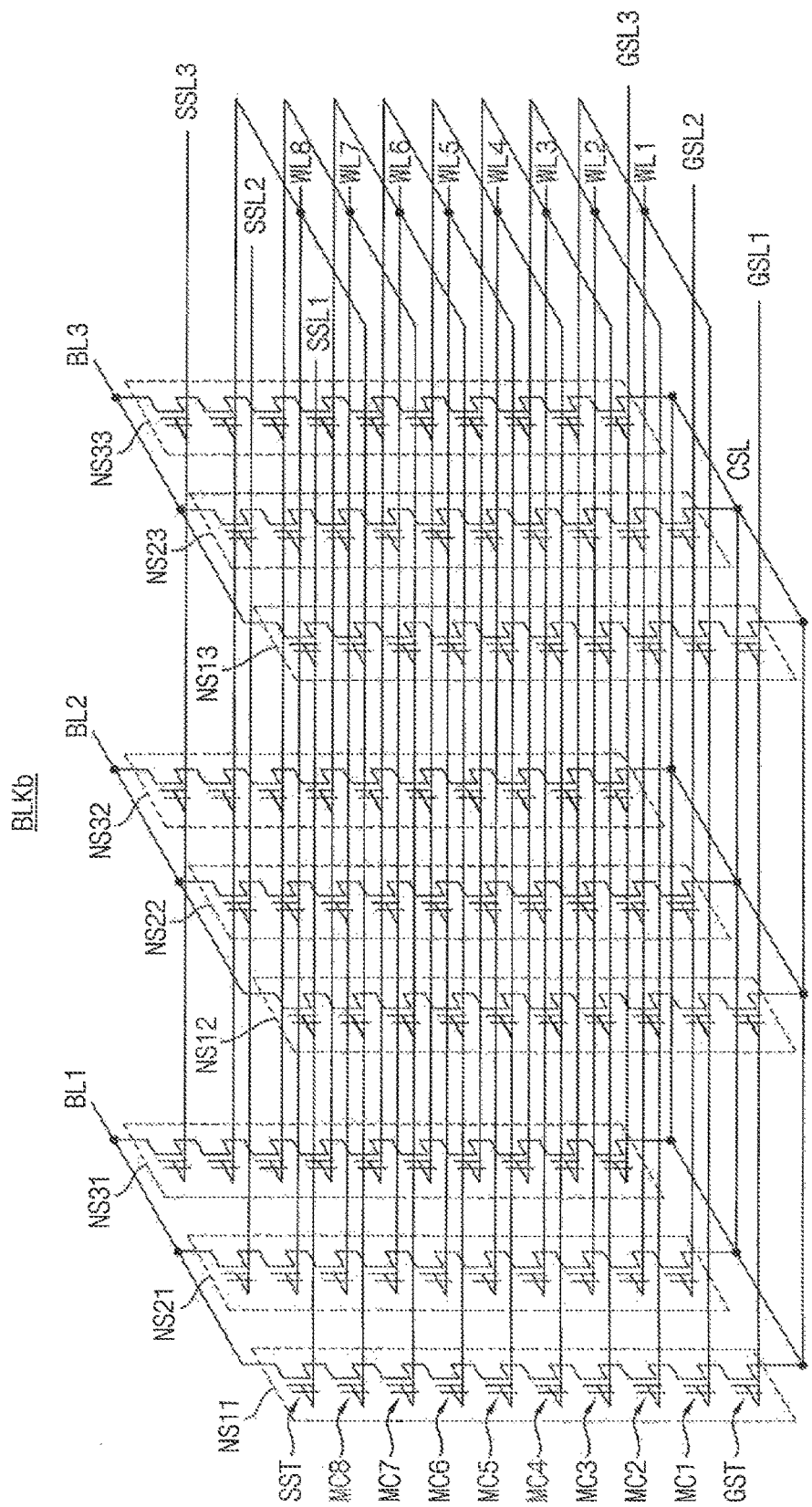
FIG. 10 is a circuit diagram illustrating an equivalent circuit of the memory block described with reference to FIGS. 8 and 9 according to an exemplary embodiment of the present inventive concept.

FIG. 10 is a circuit diagram illustrating an equivalent circuit of the memory block described with reference to FIGS. 8 and 9 according to an exemplary embodiment of the present inventive concept.

The memory block BLKb of FIG. 10 may be formed on a substrate in a three-dimensional structure (e.g., a vertical structure). For example, a plurality of memory cell strings included in the memory block BLKb may be formed in a direction perpendicular to the substrate.

Referring to FIG. 10, the memory block BLKb may include memory cell strings NS11 to NS33 coupled between bit-lines BL1, BL2 and BL3 and a common source line CSL. Each of the memory cell strings NS11 to NS33 may include a string selection transistor SST, a plurality of memory cells MC1 to MC8, and a ground selection transistor GST. In FIG. 10, each of the memory cell strings NS11 to NS33 is illustrated to include eight memory cells MC1 to MC8. However, exemplary embodiments of the present inventive concept are not limited thereto. In an exemplary embodiment of the present inventive concept, each of the memory cell strings NS11 to NS33 may include any number of memory cells.

The string selection transistor SST may be connected to corresponding string selection lines SSL1 to SSL3. The plurality of memory cells MCI to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated. In FIG. 9, the memory block BLKb is illustrated to be coupled to eight word-lines WL1 to WL8 and three bit-lines BL1 to BL3. However, exemplary embodiment of the present inventive concept are not limited thereto. In an exemplary embodiment of the present inventive concept, the memory cell array 100 may be coupled to any number of word-lines and bit-lines.

Referring back to FIG. 3, the control circuit 500 may receive a command signal CMD and an address signal ADDR from the memory controller 20 and control an erase loop, a program loop and a read operation of the nonvolatile memory device 30 based on the command signal CMD and the address signal ADDR. The program loop may include a program operation and a program verification operation. The erase loop may include an erase operation and an erase verification operation.

For example, the control circuit 500 may generate control signals CTLs, which are used for controlling the voltage generator 700, based on the command signal CMD, and generate a row address R_ADDR and a column address C_ADDR based on the address signal ADDR. The control circuit 500 may provide the row address R_ADDR to the address decoder 430 and provide the column address C_ADDR to the data input/output circuit 420. The control circuit 500 includes the hacking detection circuit 600. The hacking detection circuit 600 determines whether an access sequence of the command CMD and the address ADDR is valid based on the access sequence and disables an operation of the nonvolatile memory device 30 when the access sequence is consecutively determined as invalid. The hacking detection circuit 600 may determine the consecutive invalid access sequence as a hacking. In other words, an attempt to hack the nonvolatile memory device 30.

The address decoder 430 may be coupled to the memory cell array 100 through the string selection line SSL, the plurality of word-lines WLs, and the ground selection line GSL. During the program operation or the read operation, the address decoder 430 may determine one of the plurality of word-lines WLs as a first word-line (e.g., a selected word-line) based on the row address R_ADDR, and determine the rest of the plurality of word-lines WLs except for the first word-line as unselected word-lines based on the row address R_ADDR.

The voltage generator 700 may generate word-line voltages VWLs, which are used for the operation of the nonvolatile memory device 10, based on the control signals CTLs. The voltage generator 700 may receive a power PWR from the memory controller 20. The word-line voltages VWLs may be applied to the plurality of word-lines WLs through the address decoder 430.

For example, during the erase operation, the voltage generator 700 may apply an erase voltage to a well of a memory block and may apply a ground voltage to entire word-lines of the memory block. During the erase verification operation, the voltage generator 700 may apply an erase verification voltage to the entire word-lines of the memory block or sequentially apply the erase verification voltage to word-lines in a word-line basis.

For example, during the program operation, the voltage generator 700 may apply a program voltage to the first word-line and may apply a program pass voltage to the unselected word-lines. In addition, during the program verification operation, the voltage generator 700 may apply a program verification voltage to the first word-line and may apply a verification pass voltage to the unselected word-lines.

In addition, during the read operation, the voltage generator 700 may apply a read voltage to the first word-line and may apply a read pass voltage to the unselected word-lines.

In addition, when a hacking occurs, or the hacking detection circuit 600 detects a hacking, the voltage generator 700 may apply a high voltage HV to the control circuit 500.

The page buffer circuit 410 may be coupled to the memory cell array 100 through the plurality of bit-lines BLs. The page buffer circuit 410 may include a plurality of page buffers. In an exemplary embodiment of the present inventive concept, one page buffer may be connected to one bit-line. In an exemplary embodiment of the present inventive concept, one page buffer may be connected to two or more bit-lines.

The page buffer circuit 410 may temporarily store data to be programmed in a selected page or data read out from the selected page.

The data input/output circuit 420 may be coupled to the page buffer circuit 410 through data lines DL. During the program operation, the data input/output circuit 410 may receive program data DATA from the memory controller 20 and provide the program data DATA to the page buffer circuit 410 based on the column address C_ADDR received from the control circuit 500. During the read operation, the data input/output circuit 420 may provide read data DATA, which are stored in the page buffer circuit 410, to the memory controller 20 based on the column address C_ADDR received from the control circuit 500.

In addition, the page buffer circuit 410 and the data input/output circuit 420 read data from a first area of the memory cell array 100 and write the read data to a second area of the memory cell array 100. In other words, the page buffer circuit 410 and the data input/output circuit 420 may perform a copy-back operation.

Figure 11:
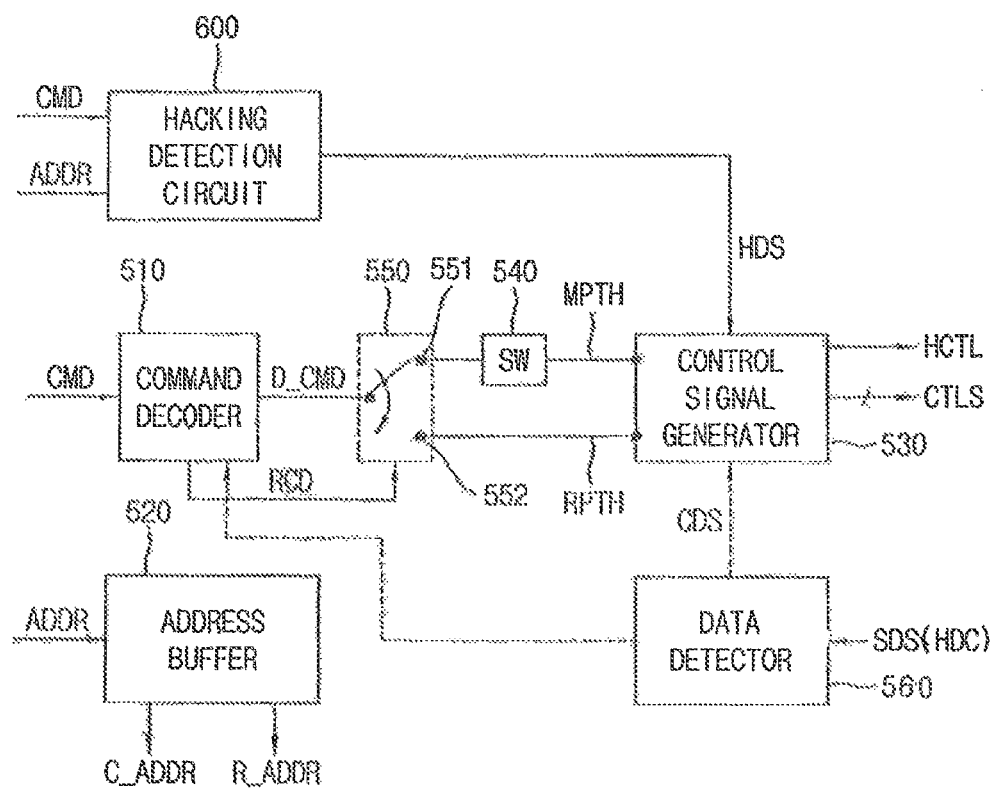
FIG. 11 is a block diagram illustrating a control circuit in the nonvolatile memory device of FIG. 3 according to an exemplary embodiment of the present inventive concept.

FIG. 11 is a block diagram illustrating the control circuit in the nonvolatile memory device of FIG. 3 according to an exemplary embodiment of the present inventive concept.

Referring to FIG. 11, the control circuit 500 includes a command decoder 510, an address buffer 520, a control signal generator 530, a first switch 540, a second switch 550 and the hacking detection circuit 600. The control circuit 500 may further include a data detector 560.

The command decoder 510 decodes the command signal CMD and provides a decoded command D_CMD to the control signal generator 530 via the second switch 550 and the first switch 540.

The address buffer 520 receives the address signal ADDR, provides the row address R_ADDR to the address decoder 430 and provides the column address C_ADDR to the data input/output circuit 420.

The control signal generator 530 receives the decoded command D_CMD, generates the control signals CTLs based on an operation directed by the decoded command D_CMD and provides the control signals CTLs to the voltage generator 700.

The second switch 550, which is a three-terminal switch, has an input terminal connected to the command decoder 510, a first terminal 551 connected to the first switch 540 and a second terminal 552 connected to the command decoder 530 via a recovery path RPTH. The second switch 550 connects the command decoder 510 to the first switch 540 except in a case when a recovery code RCD is applied to the second switch 550. When the recovery code RCD is applied to the second switch 550 from the command decoder 510, the second switch 550 connects the command decoder 510 to the control signal generator 530 via the recovery path RPTH. The recovery path RPTH is connected to the control signal generator 530 separately from a main path MPTH.

The first switch 540 may connect the command decoder 510 to the control signal generator 530 through the main path MPTH before the first switch 540 is broken in response to the high voltage HV. When the hacking detection circuit 600 detects that a hacking occurs (e.g., a hacking is detected) based on an access request of the command CMD and the address ADDR, the hacking detection circuit 600 provides a hacking detection signal HDS to the control signal generator 530.

The control signal generator 530 provides a hacking control signal HCTL to the voltage generator 700 in response to the hacking control signal HDS and the voltage generator 700 provides the high voltage HV to the first switch 540 in response to the hacking control signal HCTL to break the first switch 540. When the first switch 540 is broken, the command decoder 510 is disconnected from the control signal generator 530 and operation of the nonvolatile memory device 30 is disabled until the recover path PRTH is connected to the command decoder 510.

The hacking detection circuit 600 receives the access sequence of the command CMD and the address ADDR and determines whether the access sequence matches with a standard sequence defined in a specification of the nonvolatile memory device 30. When the access sequence does not match with the standard sequence consecutively more than a reference value, the hacking detection circuit 600 enables the hacking detection signal HDS and provides the enabled signal HDS to the control signal generator 530.

When the control signal generator 530 receives the hacking detection signal HDS that is enabled, the control signal generator 530 provides the hacking control signal HCTL to the voltage generator 700 and the voltage generator 700 provides the high voltage HV to the first switch 540 in response to the hacking control signal HCTL to break the first switch 540 as described above.

In addition, the hacking detection circuit 600 may provide the hacking detection signal FIDS to the page buffer circuit 410 in FIG. 3 and the page buffer circuit 410 may write data code associated with hacking detection in the setup data region SDA in response to the hacking detection signal HDS. Afterwards, when the power starts to be supplied to the nonvolatile memory device 30 (e.g., when the nonvolatile memory device 30 is powered-up), the page buffer circuit 410 reads setup data set SDS from the setup data region SDA and provides the setup data set SDS to the data detector 560. The data detector 560 may provide a code detection signal CDS to the control signal generator 530 according to hacking detection-related data code HDC of the setup data set SDS. The data detector 560 may provide the command decoder 510 with the rest of the setup data of the setup data set SDS except for the hacking detection-related data code HDC. Although the data detector 560 is included in the control circuit 500 in FIG. 11, the data detector 560 may be included in the page buffer circuit 410. In this case, the page buffer circuit 410 may provide the code detection signal CDS to the control signal generator 530 and provide the rest of the setup data of the setup data set SDS except for the hacking detection-related data code HDC.

When the control signal generator 530 receives the code detection signal CDS that is enabled, the control signal generator 530 provides the hacking control signal HCTL to the voltage generator 700 and the voltage generator 700 provides the high voltage HV to the first switch 540 in response to the hacking control signal HCTL to break the first switch 540 as described above.

Figure 12:
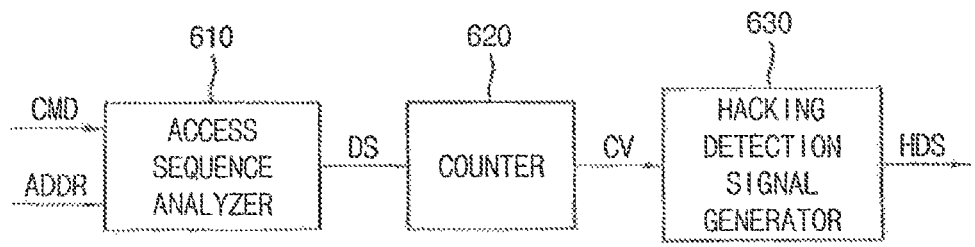
FIG. 12 is a block diagram illustrating a hacking detection circuit in the control circuit of FIG. 11 according to an exemplary embodiment of the present inventive concept.

FIG. 12 is a block diagram illustrating the hacking detection circuit in the control circuit of FIG. 11 according to an exemplary embodiment of the present inventive concept.

Referring to FIG. 12, the hacking detection circuit 600 may include an access sequence analyzer 610, a counter 620 and a hacking detection signal generator 630.

The access sequence analyzer 610 determines whether the access sequence of the command CMD and the address ADDR matches with the standard sequence and outputs a decision signal DS which is enabled at a first logic level when the access sequence does not match with the standard sequence. The access sequence analyzer 610 outputs the decision signal DS which is disabled at a second logic level when the access sequence matches with the standard sequence.

The counter 620 counts the decision signal DS that is enabled to output a counting signal CV. When the counter 620 receives the decision signal DS that is disabled, the counter 620 may be reset. The hacking detecting signal generator 630 receives the counting signal CV and outputs the hacking detection signal HDS that is enabled when the counting signal CV exceeds a reference value.

The access sequence analyzer 610 may output the decision signal DS that is enabled when at least one of the command CMD and the address ADDR sequence does not match with the standard sequence.

Figure 13:
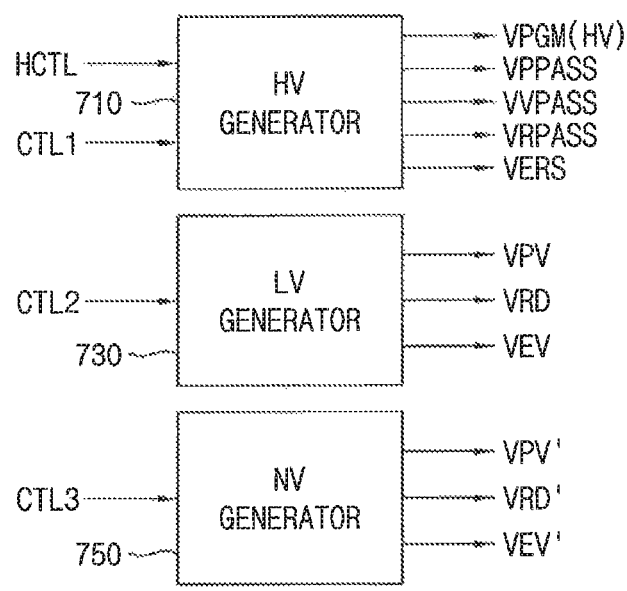
FIG. 13 is a block diagram illustrating a voltage generator in the nonvolatile memory device of FIG. 3 according to an exemplary embodiment of the present inventive concept.

FIG. 13 is a block diagram illustrating the voltage generator in the nonvolatile memory device of FIG. 3 according to an exemplary embodiment of the present inventive concept.

Referring to FIG. 13, the voltage generator 700 includes a high voltage generator 710 and a low voltage generator 730. The voltage generator 700 may further include a negative voltage generator 750.

The high voltage generator 710 may generate a program voltage VPGM, a program pass voltage VPPASS, a verification pass voltage VVPASS, a read pass voltage VRPASS and an erase voltage VERS according to operations directed by the decoded command D_CMD, in response to a first control signal CTL1. The program voltage VPGM is applied to the selected word-line, the program pass voltage VPPASS, the verification pass voltage VVPASS, the read pass voltage VRPASS may be applied to the unselected word-lines and the erase voltage VERS may be applied to the well of a memory block. The first control signal CTL1 may include a plurality of bits which indicate the operations directed by the decoded command D_CMD and the number of the program/erase cycles indicated by a comparison signal CS. The high voltage generator 710 may apply the program voltage VPGM as the high voltage HV to the first switch 540 in response to the hacking control signal HCTL.

The low voltage generator 730 may generate a program verification voltage VPV, a read voltage VRD and an erase verification voltage VER according to operations directed by the decoded command D_CMD, in response to a second control signal CTL2. The program verification voltage VPV, the read voltage VRD and the erase verification voltage VER may be applied to the selected word-line according to an operation of the nonvolatile memory device 30. The second control signal CTL2 may include a plurality of bits which indicate the operations directed by the decoded command D_CMD.

The negative voltage generator 750 may generate a program verification voltage VPV', a read voltage VRD' and an erase verification voltage VER' which have negative levels according to operations directed by the decoded command D_CMD, in response to a third control signal CTL3. The third control signal CTL3 may include a plurality of bits which indicate the operations directed by the decoded command D_CMD.

Figure 14:
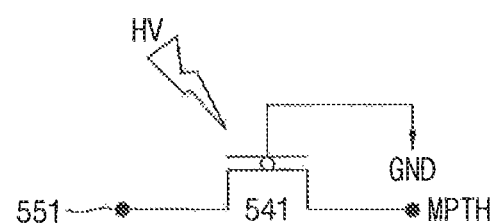
FIG. 14 illustrates a first switch in the control circuit of FIG. 11 according to an exemplary embodiment of the present inventive concept.

FIG. 14 illustrates the first switch in the control circuit of FIG. 11 according to an exemplary embodiment of the present inventive concept.

Referring to FIG. 14, a first switch 540a may include p-channel metal oxide semiconductor (PMOS) transistor 541. The PMOS transistor 541 has a first electrode coupled to the first terminal 551 of the second switch 550, a gate coupled to the ground voltage GND and a second electrode coupled to the main path MPTH.

Therefore, the first switch 540a connects the command decoder 510 to the control signal generator 530 through the main path MPTH before the high voltage HV is applied to the first switch 540a. When the high voltage HV is applied to the first switch 540a, the first switch 540a is broken and the command decoder 510 is disconnected from the control signal generator 530. The high voltage HV has a voltage level high enough to break the first switch 540a.

Figure 15:
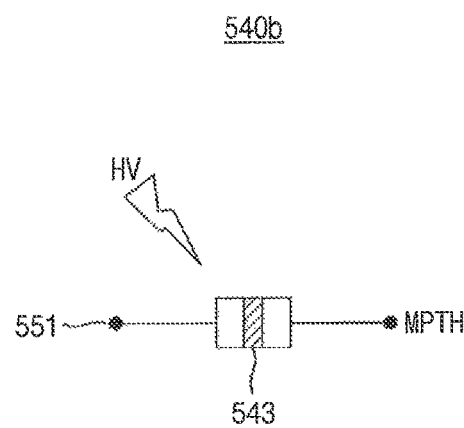
FIG. 15 illustrates a first switch in the control circuit of FIG. 11 according to an exemplary embodiment of the present inventive concept.

FIG. 15 illustrates the first switch in the control circuit of FIG. 11 according to an exemplary embodiment of the present inventive concept.

Referring to FIG. 15, a first switch 540b may include an electrical fuse 543 connected between the first terminal 551 of the second switch 550 and the main path MPTH. The electrical fuse 543 has a first terminal coupled to the first terminal 551 of the second switch 550 and a second terminal coupled to the main path MPTH.

Therefore, the first switch 540b connects the command decoder 510 to the control signal generator 530 through the main path MPTH before the high voltage HV is applied to the first switch 540b. When the high voltage HV is applied to the first switch 540b, the first switch 540b is cut and the command decoder 510 is disconnected from the control signal generator 530. The high voltage HV has a voltage level high enough to cut the first switch 540b.

Figure 16:
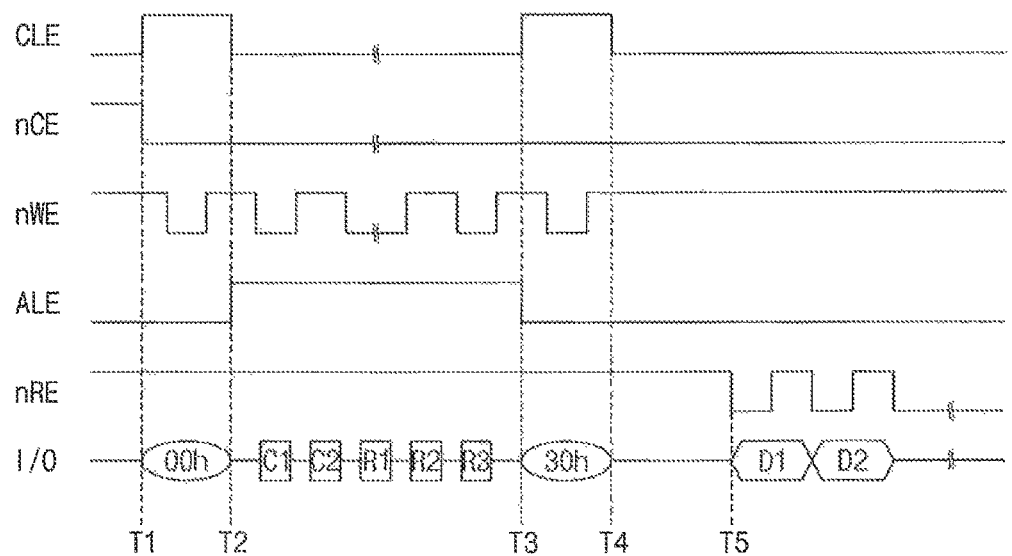
FIG. 16 illustrates an access request to the nonvolatile memory device of FIG. 3 according to an exemplary embodiment of the present inventive concept.

FIG. 16 illustrates an access request to the nonvolatile memory device of FIG. 3 according to an exemplary embodiment of the present inventive concept.

Referring to FIGS. 1, 3 and 16, the chip enable signal nCE is activated at a low level at a first timing T1 and is maintained at an activated state. When the command latch enable signal CLE is activated between timings T1 and T2, a '00h' command CMD is transferred to the control circuit 500. The address latch enable signal ALE is activated at a high level between timings T2 and T3, and an address C1C2R1R2R3 for a target page is sequentially transferred to the control circuit 500. When the command latch enable signal CLE is activated between timings T3 and T4, a '30h' command CMD is transferred to the control circuit 500, and the page buffer circuit 410 senses and latches data of the target page from memory cell array 100 under control of the control circuit 500 between timings T4 and T5. If the sensing and latching of the data of the target page are completed, data D1, D2, . . . stored in the page buffer circuit 410 are provided to the memory controller 20 through the data input/output circuit 420 in synchronization with the read enable signal nRE transitioning to a low level after the timing T5.

In FIG. 16, the write enable signal nWE is activated at a low level respectively between the timings T1 and T2 when the '00h' command CMD is input and between the timings T3 and T4 when the address C1C2R1R2R3 is input and is disabled at a high level after the timing T4.

FIG. 16 illustrates the access sequence when a read operation is performed on the nonvolatile memory device 30. When the access to the nonvolatile memory device 30 is invalid, command sets such as '00h' and '30h' do not match with standard command sets defined in the specification of the nonvolatile memory device 30. In addition, the access address C1C2R1R2R3 input to the control circuit 500 after the '00h' command includes two column addresses C1C2 and three row addresses R1R2R3 which are sequentially input to the control circuit 500. However, the access address C1C2R1R2R3 does not match with standard sequence when the access to the nonvolatile memory device 30 is invalid. The hacking detection circuit 600 determines whether the access sequence of the command CMD and the address ADDR matches with the standard sequence, enables the hacking detection signal HDS when the access sequence does not match with the standard sequence consecutively more times than a reference value, and provides the hacking detection signal HDS that is enabled to the control signal generator 530.

Figure 17:
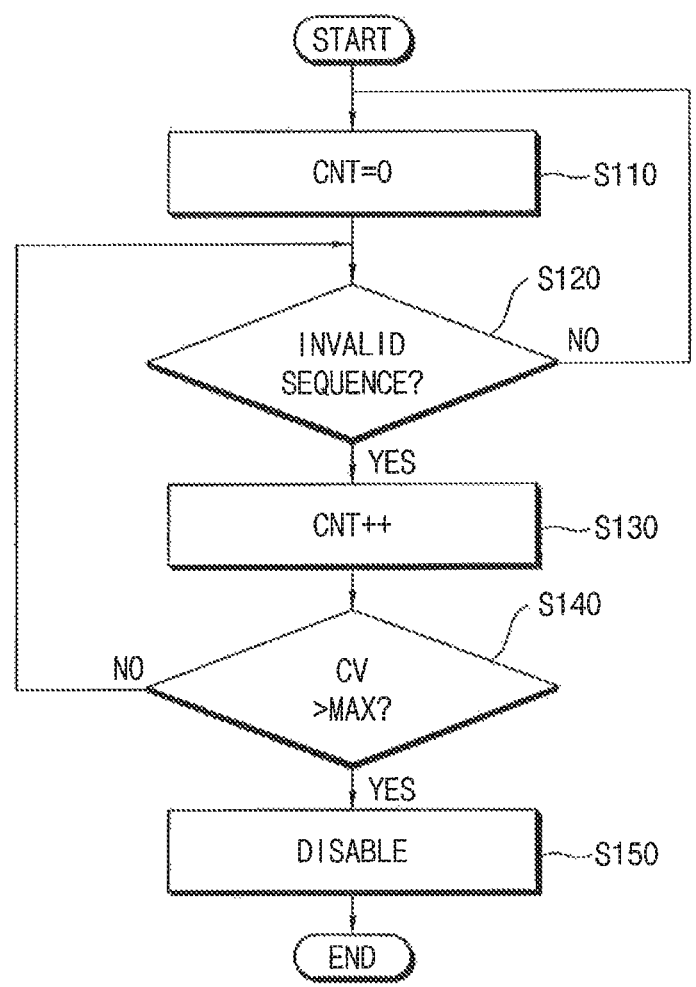
FIG. 17 is a flow chart illustrating a method of a nonvolatile memory device according to an exemplary embodiment of the present inventive concept.

FIG. 17 is a flow chart illustrating a method of a nonvolatile memory device according to an exemplary embodiment of the present inventive concept.

Referring to FIGS. 3 and 11 through 17, the counter 620 in the hacking detection circuit 600 is reset 5110. The access sequence analyzer 610 in the hacking detection circuit 600 determines whether the access sequence of the command CMD and the address ADDR matches with the standard sequence (S120). When the access sequence is valid (NO in S120), the counter 620 is reset again (S110). When the access sequence is invalid (YES in S120), the counting signal CV of the counter 620 is increased by one (S130). It is determined whether the counting signal CV exceeds a reference value MAX (S140). When the counting signal CV does not exceed the reference value MAX (NO in S140), the method returns to the step (S120). When the counting signal CV exceeds the reference value MAX (YES in S140), the hacking detection signal HDS is enabled by the hacking detection signal generator 630 and the operation of the nonvolatile device 30 is disabled in response to the hacking detection signal HDS that is enabled (S150).

In the method of FIG. 17, it is determined whether the access sequence matches with the standard sequence without regard to an input sequence (e.g., order) of the access sequence.

Figure 18:
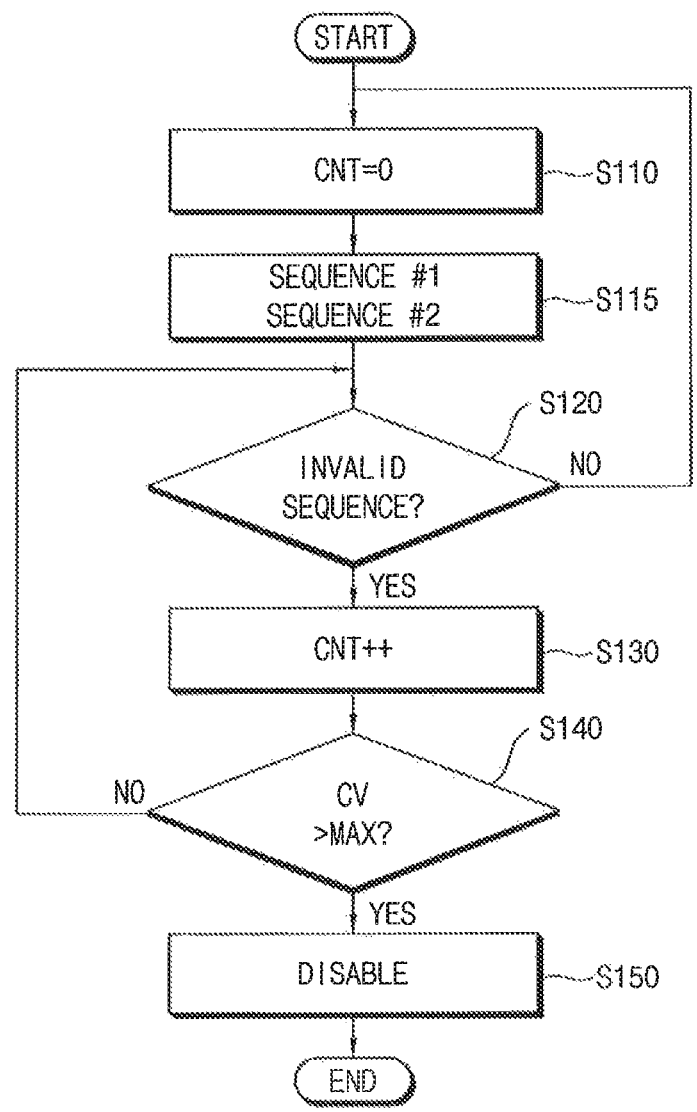
FIG. 18 is a flow chart illustrating a method of a nonvolatile memory device according to an exemplary embodiment of the present inventive concept.

FIG. 18 is a flow chart illustrating a method of a nonvolatile memory device according to an exemplary embodiment of the present inventive concept.

The method of FIG. 18 is different from the method of FIG. 17 in that it determines whether the access sequence matches with the standard sequence depending on an input sequence of the access sequence.

Referring to FIG. 3, 11 through 16 and 18, the counter 620 in the hacking detection circuit 600 is reset S110. The access sequence analyzer 610 in the hacking detection circuit 600 receives a first access sequence SEQUENCE#1 and a second access sequence SEQUENCE#2. At this time, the access sequence analyzer 610 does not determine whether the first access sequence SEQUENCE#1 and the second access sequence SEQUENCE#2 match with the standard sequence (S115). The access sequence analyzer 610 then determines whether the access sequence matches with the standard sequence (S120). The steps after the step S120 are substantially the same as those in FIG. 17 and thus will not be described further.

Figure 19:
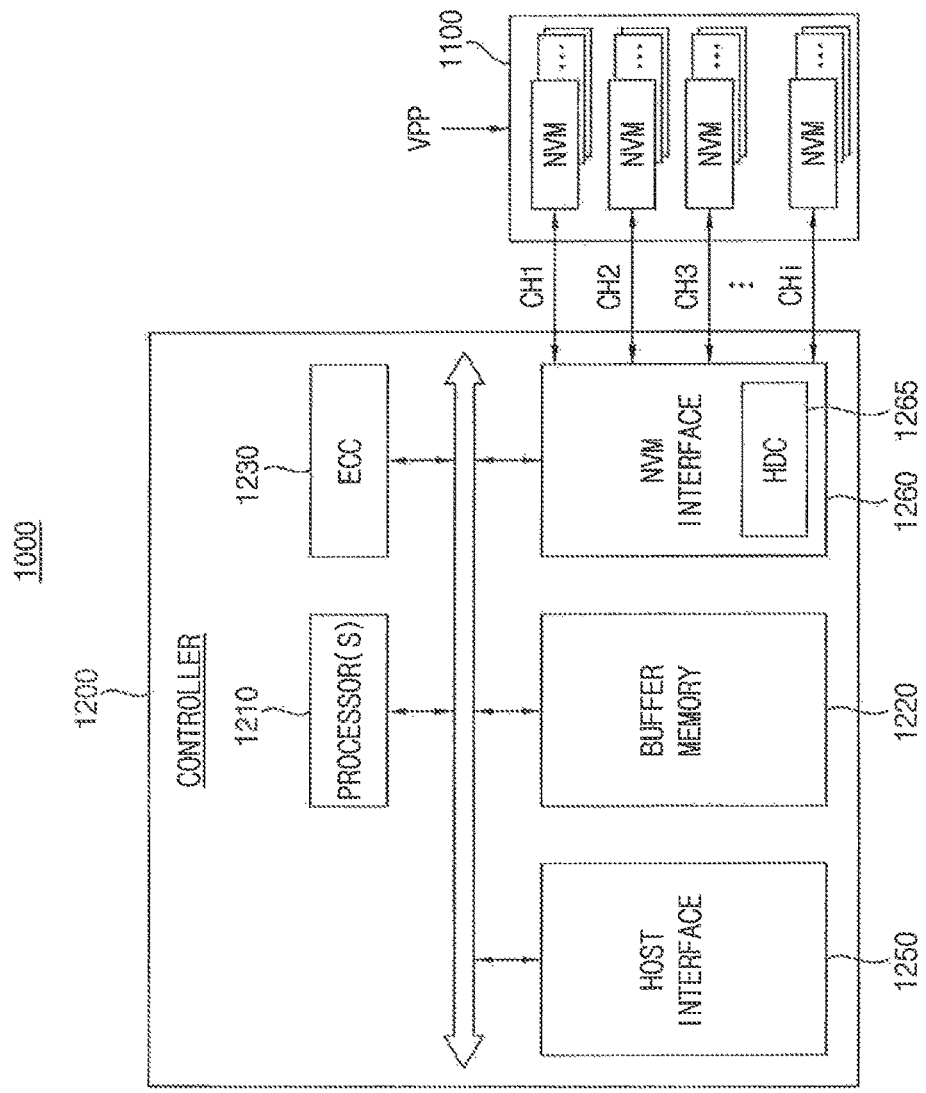
FIG. 19 is a block diagram illustrating a solid state disk or solid state drive (SSD) according to an exemplary embodiment of the present inventive concept.

FIG. 19 is a block diagram illustrating a solid state disk or solid state drive (SSD) according to an exemplary embodiment of the present inventive concept.

Referring to FIG. 19, an SSD 1000 includes multiple nonvolatile memory devices 1100 and an SSD controller 1200.

The nonvolatile memory devices 1100 may be optionally supplied with an external high voltage VPP. Each of the nonvolatile memory devices 1100 may employ the nonvolatile memory device 30 of FIG. 3. Each of the nonvolatile memory devices 1100 may include a memory cell array, a control circuit, a voltage generator, a page buffer circuit and a data input/output circuit.

The SSD controller 1200 is connected to the nonvolatile memory devices 1100 through multiple channels CH1 to CHi. The SSD controller 1200 includes one or more processors 1210, a buffer memory 1220, an error correction code (ECC) block 1230, a host interface 1250, and a nonvolatile memory interface 1260.

The buffer memory 1220 stores data used to drive the SSD controller 1200. The buffer memory 1220 includes multiple memory lines each storing data or a command. Although FIG. 19 illustrates an embodiment where the buffer memory 1220 is included in the SSD controller 1200, the inventive concept is not limited thereto. For instance, the buffer memory 1220 may be placed outside the SSD controller 1200.

The ECC block 1230 calculates ECC values of data to be programmed at a writing operation and corrects an error of read data using an ECC value at a read operation. In a data recovery operation, the ECC block 1230 corrects an error of data recovered from the nonvolatile memory devices 1100. A code memory may be further included in the SSC1000 to store code data used to drive the SSD controller 1200. The code memory may be implemented by a nonvolatile memory device.

The host interface 1250 provides an interface with an external device. The nonvolatile memory interface 1260 provides an interface with the nonvolatile memory devices 1100. The nonvolatile memory interface 1260 may include a hacking detection circuit 1265. The hacking detection circuit 1265 may employ the hacking detection circuit 600 of FIG. 12, may determine whether an access sequence to each of the nonvolatile memory devices 1100 matches with the standard sequences therein and may disable the operation of the nonvolatile memory devices 1100 selectively according to a result of the determination.

Figure 20:
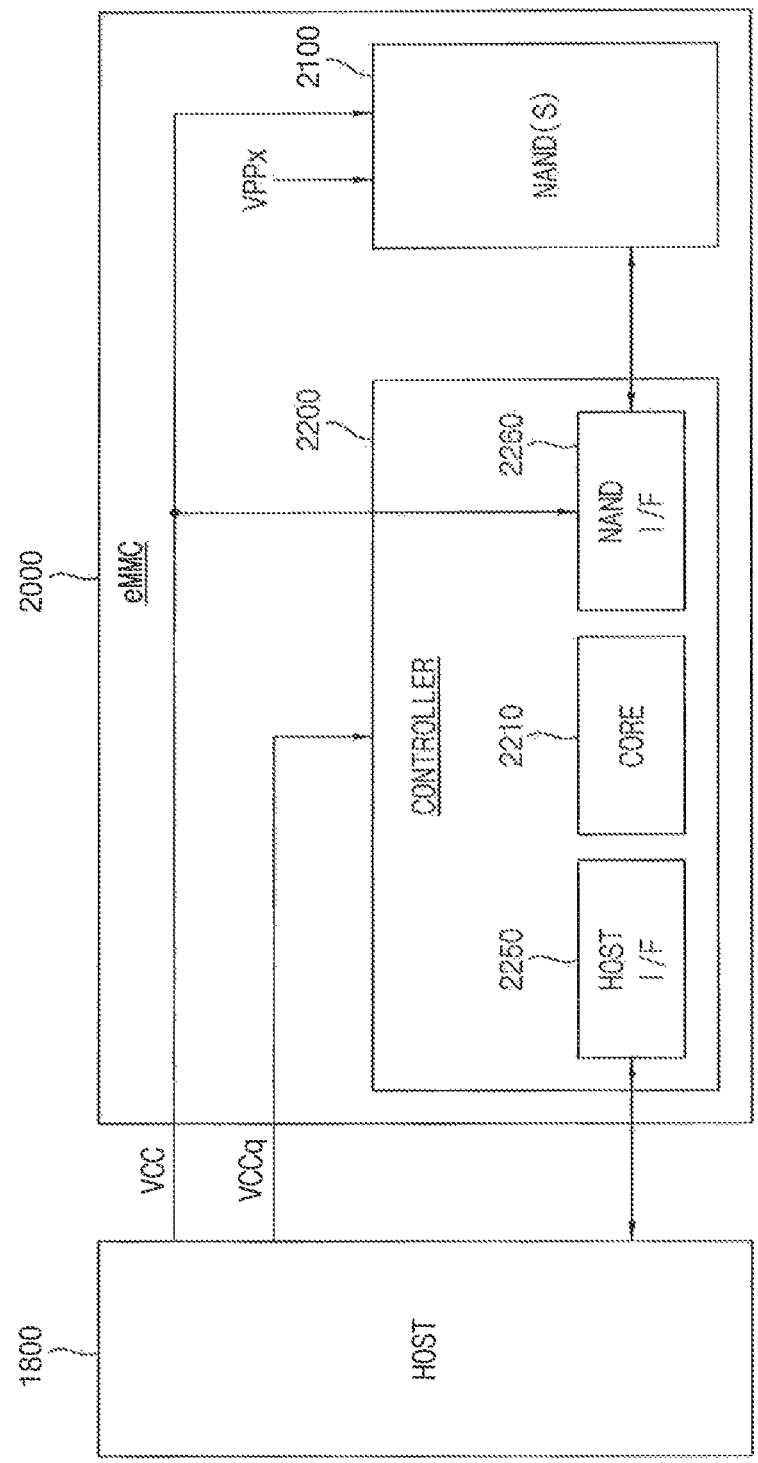
FIG. 20 is a block diagram illustrating an embedded multi-media card (eMMC) according to an exemplary embodiment of the present inventive concept.

FIG. 20 is a block diagram illustrating an embedded multi-media card (eMMC) according to an exemplary embodiment of the present inventive concept.

Referring to FIG. 20, an eMMC 2000 includes one or more NAND flash memory devices 2100 and a controller 2200.

The NAND flash memory device 2100 may employ the nonvolatile memory device 30 of FIG. 3. The NAND flash memory device 2100 may include a memory cell array, a control circuit, a voltage generator, a page buffer circuit and a data input/output circuit. The control circuit may employ the control circuit 500 of FIG. 11 and may include a hacking detection circuit. The hacking detection circuit may determine whether an access sequence to the NAND flash memory device 2100 matches with the standard sequence and disable NAND flash memory device 2100 according to a result of the determination.

The controller 2200 is connected with the NAND flash memory device 2100 via multiple channels. The controller 2200 includes one or more controller cores 2210, a host interface 2250, and a NAND interface 2260. The controller core 2210 controls an overall operation of the eMMC 2000. The host interface 2250 is configured to perform an interface between the controller 2210 and a host 1800. The NAND interface 2260 is configured to provide an interface between the NAND flash memory device 2100 and the controller 2200. In an exemplary embodiment of the present inventive concept, the host interface 2250 may be a parallel interface (e.g., an MMC interface). In an exemplary embodiment of the present inventive concept, the host interface 2250 of eMMC 2000 may be a serial interface (e.g., ultra high-speed (UHS)-II, universal flash storage (UFS), etc.).

The eMMC 2000 receives power supply voltages Vcc and Vccq from the host 1800. For example, the power supply voltage Vcc (e.g., about 3.3V) is supplied to the NAND flash memory device 2100 and the NAND interface 2260, and the power supply voltage Vccq (e.g., about 1.8V/3.3V) is supplied to the controller 2200. In an exemplary embodiment of the present inventive concept, eMMC 2000 may be optionally supplied with an external high voltage VPPx.

Figure 21:
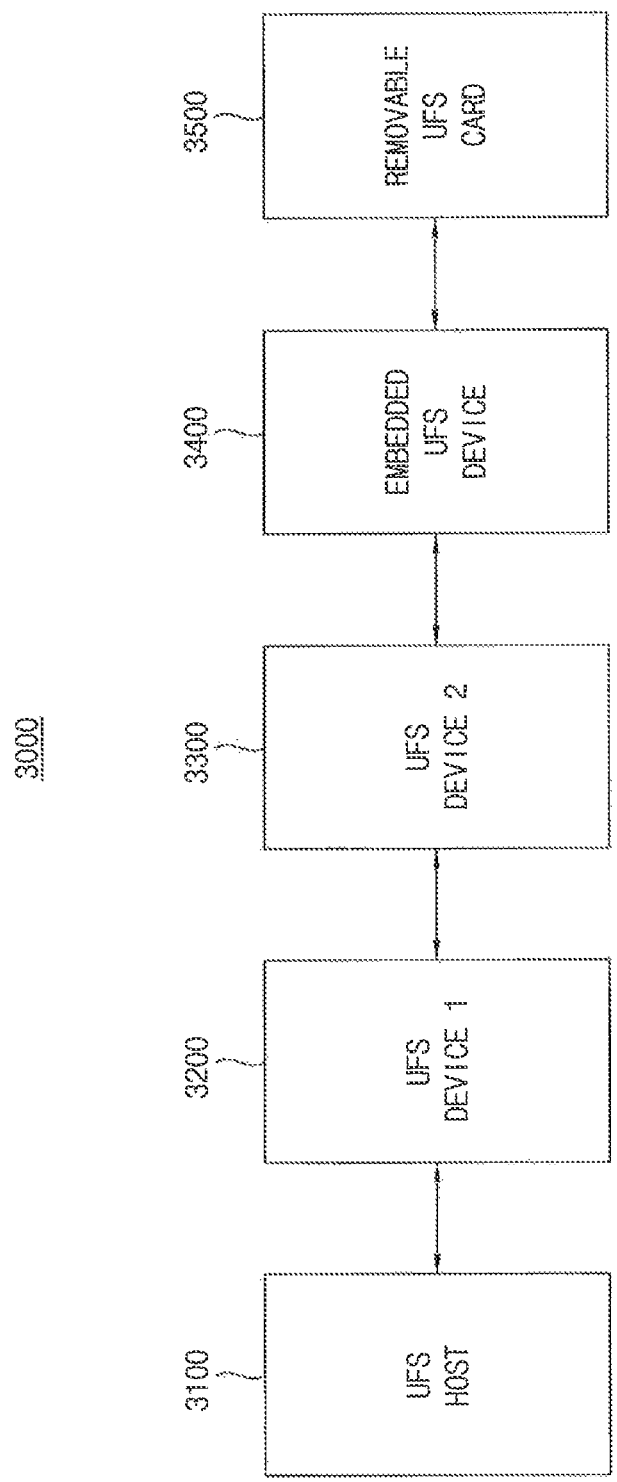
FIG. 21 is a block diagram illustrating a universal flash storage (UFS) according to an exemplary embodiment of the present inventive concept.

FIG. 21 is a block diagram illustrating a UFS according to an exemplary embodiment of the present inventive concept.

Referring to FIG. 21, a UFS system 3000 may include a UFS host 3100, UFS devices 3200 and 3300, an embedded UFS device 3400, and a removable UFS card 3500. The UFS host 3100 may be an application processor of a mobile device. Each of the UFS host 3100, the UFS devices 3200 and 3300, the embedded UFS device 3400 and the removable UFS card 3500 communicate with external devices through the UFS protocol. At least one of the UFS devices 3200 and 3300, the embedded UFS device 3400, and the removable UFS card 3500 is implemented by the nonvolatile memory device 30 of FIG. 3. Therefore, at least one of the UFS devices 3200 and 3300, the embedded UFS device 3400, and the removable UFS card 3500 may include a memory cell array, a control circuit, a voltage generator, a page buffer circuit and a data input/output circuit. The control circuit may employ the control circuit 500 of FIG. 11 and may include a hacking detection circuit. The hacking detection circuit may determine whether an access sequence to at least one of the UFS devices 3200 and 3300, the embedded UFS device 3400, and the removable UFS card 3500 matches with the standard sequence and disable at least one of the UFS devices 3200 and 3300, the embedded UFS device 3400, and the removable UFS card 3500 selectively according to a result of the determination.

In addition, the embedded UFS device 3400 and the removable UFS card 3500 may perform communications using protocols different from the UFS protocol. For example, the UFS host 3100 and the removable UFS card 3500 may communicate through various card protocols (e.g., UFDs, MMC, secure digital (SD), mini SD, Micro SD, etc.).

Figure 22:
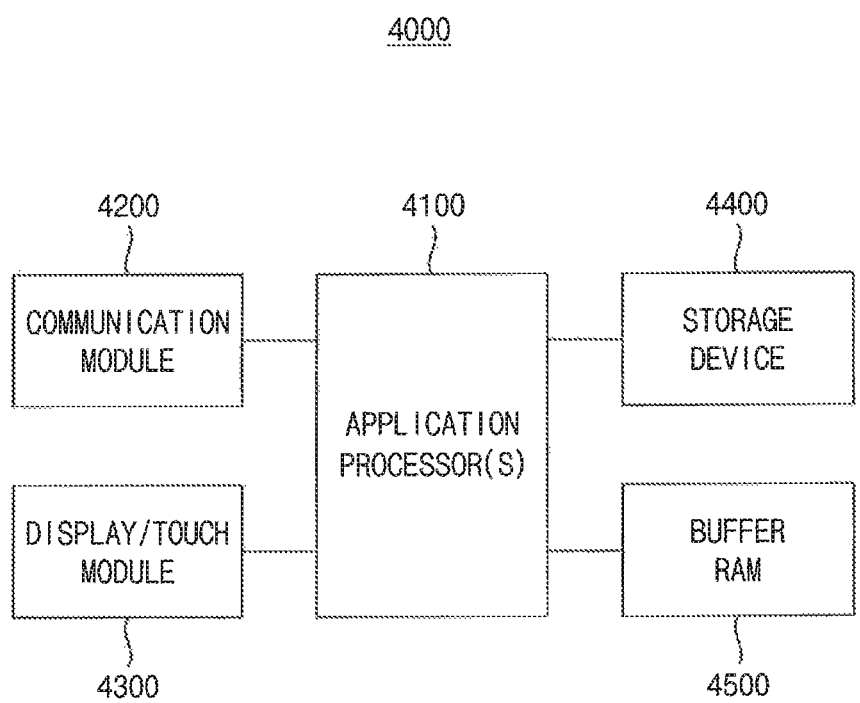
FIG. 22 is a block diagram illustrating a mobile device according to an exemplary embodiment of the present inventive concept.

FIG. 22 is a block diagram illustrating a mobile device according to an exemplary embodiment of the present inventive concept.

Referring to FIG. 22, a mobile device 4000 may include an application processor 4100, a communication module 4200, a display/touch module 4300, a storage device 4400, and a buffer random access memory (RAM) 4500 (e.g., mobile RAM).

The application processor 4100 controls operations of the mobile device 4000. The communication module 4200 is implemented to perform wireless or wired communications with an external device. The display/touch module 4300 is implemented to display data processed by the application processor 4100 or to receive data through a touch panel. The storage device 4400 is implemented to store user data. The storage device 4400 may be an eMMC, an SSD, a UFS device, etc. The storage device 4400 may employ the nonvolatile memory device 30 of FIG. 3. The storage device 4400 may include a memory cell array, a control circuit, a voltage generator, a page buffer circuit and a data input/output circuit. The control circuit may employ the control circuit 500 of FIG. 11 and may include a hacking detection circuit. The hacking detection circuit may determine whether an access sequence to the storage device 4400 matches with the standard sequence and disable the storage device 4400 according to a result of the determination.

The buffer RAM 4500 temporarily stores data used for processing operations of the mobile device 4000.

A memory device or a storage device according to an exemplary embodiment of the present inventive concept may be packaged using various package types or package configurations, such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), or the like.

Exemplary embodiments of the present inventive concept may be applied to various electronic devices including a nonvolatile memory device. For example, the exemplary embodiments may be applied to systems such as a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

According to an exemplary embodiment of the present inventive concept, in a nonvolatile memory device and an SSD, a hacking detection circuit is provided that determines whether an access sequence matches with a standard sequence and disables an operation of the nonvolatile memory device when the access sequence does not match with the standard sequence a certain number of times. Therefore, access to the nonvolatile memory device by an invalid user may be prevented. In addition, the disabled operation of the nonvolatile memory device may be recovered afterwards.

While the present inventive concept has been particularly shown and described with reference to exemplary embodiments thereof, it will be apparent to those of ordinary skill in the art that various changes in form and detail may be made therein without departing from the spirit and scope of the present inventive concept as defined by the following claims.

What is claimed is:

1. A nonvolatile memory device, comprising:
a memory cell array;

a voltage generator configured to generate word-line voltages to be applied to the memory cell array; and
a control circuit configured to generate control signals that control the voltage generator in response to a command and an address,
wherein the control circuit is configured to disable an operation of the nonvolatile memory device when a hacking is detected by a hacking detection circuit of the control circuit, wherein the hacking is detected when an access sequence of the command and the address does not match a standard sequence of the nonvolatile memory device a consecutive number of times, wherein the operation of the nonvolatile memory device is disabled in response to a voltage signal provided from the voltage generator,
wherein the control circuit further comprises:
a command decoder configured to decode the command and to output a decoded command;
a control signal generator configured to generate the control signals in response the decoded command;
a first switch connected between the command decoder and a first path connected to the control signal generator; and
a second switch connected to the command decoder, a second path and the first switch, and
wherein the second path is connected to the control signal generator separately from the first path.

2. The nonvolatile memory device of claim 1, wherein the hacking detection circuit comprises:
an access sequence analyzer configured to analyze the access sequence and to output a decision signal that is enabled when the access sequence does not match the standard sequence;
a counter configured to count the decision signal that is enabled and to output a counting signal; and
a hacking detection signal generator configured to receive the counting signal and to output a hacking detection signal that is enabled when the counting signal exceeds a reference value.

3. The nonvolatile memory device of claim 2, wherein the access sequence analyzer is configured to output the decision signal without regard to an input sequence of the access sequence.

4. The nonvolatile memory device of claim 2, wherein the access sequence analyzer is configured to output the decision signal depending on an input sequence of the access sequence.

5. The nonvolatile memory device of claim 1, wherein the first switch connects a first terminal of the second switch to the control signal generator except when the hacking is detected, and
wherein the second switch connects the command decoder to the first switch except when a recovery code is applied to the second switch.

6. The nonvolatile memory device of claim 1, wherein when the hacking is detected,
the hacking detection circuit is configured to output a hacking detection signal to the control signal generator, and
the control signal generator is configured to provide a hacking control signal to the voltage generator in response to the hacking detection signal and, in response to the hacking control signal, a high voltage is applied as the voltage signal to the first switch from the voltage generator and the first path is blocked.

7. The nonvolatile memory device of claim 1, wherein when the hacking is detected,
the control circuit is configured to program data code associated with the hacking in a setup data region of the memory cell array,
the control circuit further includes a data detector configured to read the data code from the setup data region when a power is applied to the nonvolatile memory device,
the data detector is configured to provide a code detection signal to the control signal generator in response to the read data code,
the control signal generator is configured to provide a hacking control signal to the voltage generator in response to the code detection signal, and
the voltage generator is configured to provide a high voltage, as the voltage signal, to the first switch in response to the hacking control signal to block the first path.

8. The nonvolatile memory device of claim 1, wherein the first switch includes a p-channel metal oxide semiconductor (PMOS) transistor, and
the PMOS transistor has a first electrode coupled to a first terminal of the second switch, a gate coupled to a ground voltage and a second electrode coupled to the first path.

9. The nonvolatile memory device of claim 1, wherein the first switch includes a fuse connected between a first terminal of the second switch and the first path.

10. The nonvolatile memory device of claim 1, wherein when the hacking is determined as valid after the first path is blocked due to the voltage signal, the second switch connects the command decoder to the second path in response to a recovery code provided from the command decoder.

11. The nonvolatile memory device of claim 1, wherein the memory cell array includes a two-dimensional memory cell array formed on a substrate in a two-dimensional structure.

12. The nonvolatile memory device of claim 1, wherein the memory cell array includes a three-dimensional memory cell array formed on a substrate in a three-dimensional structure.

13. A solid-state drive (SSD), comprising:
a plurality of nonvolatile memory devices; and
a controller configured to control the nonvolatile memory devices,
wherein the controller is configured to disable an operation of a first of the nonvolatile memory devices when a first hacking is detected by a hacking detection circuit of the controller, wherein the first hacking is detected when an access sequence of a command and an address for accessing a memory cell array of the first nonvolatile memory device does not match a standard sequence of the first nonvolatile memory device a predetermined number of times consecutively,
wherein the controller further includes:
a command decoder configured to decode the command and output a decoded command;
a control signal generator configured to generate control signals in response the decoded command;
a first switch connected between the command decoder and a first path connected to the control signal generator; and
a second switch connected to the command decoder, a second path and the first switch, and
wherein the second path is connected to the control signal generator separately from the first path.

14. The SSD of claim 13, wherein the controller includes a nonvolatile memory interface configured to perform an interfacing with the nonvolatile memory devices and the nonvolatile memory interface includes the hacking detection circuit.

15. The SSD of claim 13, wherein the controller is configured to disable an operation of a second of the nonvolatile memory devices when a second hacking is detected by the hacking detection circuit, wherein the second hacking is detected when an access sequence of a command and an address for accessing a memory cell array of the second nonvolatile memory device does not match a standard sequence of the second nonvolatile memory device a predetermined number of times consecutively.

16. A nonvolatile memory device, comprising:
   a hacking detection circuit configured to detect a hacking of the nonvolatile memory device based on a received command and address;
   a control signal generator configured generate a hacking control signal when the hacking is detected;
   a voltage generator configured to receive the hacking control signal and output a first voltage signal;
   a first switch connected between a command decoder and the control signal generator, wherein the connection from the first switch to the control signal generator is cut response to the first voltage signal; and
   a second switch connected between the command decoder and the control signal generator, wherein the second switch is activated in response to a signal indicating that the hacking has ended.

17. The nonvolatile memory device of claim 16, wherein the first switch is disposed between the second switch and the control signal generator along a first path.

18. The nonvolatile memory device of claim 17, wherein when the second switch is activated in response to the signal indicating that the hacking has ended, a second path is formed between the second switch and the control signal generator.

19. The nonvolatile memory device of claim 16, wherein the first switch is a fuse.

* * * * *